(12) United States Patent
Shiba

(10) Patent No.: US 10,921,507 B2
(45) Date of Patent: Feb. 16, 2021

(54) OPTICAL SHEET, BACKLIGHT UNIT, LIQUID CRYSTAL DISPLAY DEVICE, AND INFORMATION EQUIPMENT

(71) Applicant: KEIWA Inc., Tokyo (JP)

(72) Inventor: Satoshi Shiba, Tokyo (JP)

(73) Assignee: KEIWA Inc., Tokyo (JP)

(*) Notice: Subject to any disclaimer, the term of this patent is extended or adjusted under 35 U.S.C. 154(b) by 0 days.

(21) Appl. No.: 16/597,346

(22) Filed: Oct. 9, 2019

(65) Prior Publication Data

US 2020/0110213 A1 Apr. 9, 2020

(30) Foreign Application Priority Data

Oct. 9, 2018 (JP) .................................. 2018-191276

(51) Int. Cl.
  *F21V 8/00* (2006.01)
(52) U.S. Cl.
  CPC .......... *G02B 6/0061* (2013.01); *G02B 6/0051* (2013.01)
(58) Field of Classification Search
  CPC ............................ G02B 6/0061; G02B 6/0051
  USPC .......................................................... 349/64
  See application file for complete search history.

(56) References Cited

U.S. PATENT DOCUMENTS

2012/0243098 A1* 9/2012 Naito ................. G02B 27/0018
359/601

FOREIGN PATENT DOCUMENTS

| JP | 2001-297615 A | | 10/2001 |
| JP | 2001297615 A | * | 10/2001 |
| JP | 4638061 B | | 12/2010 |

* cited by examiner

*Primary Examiner* — Nathanael R Briggs
*Assistant Examiner* — William D Peterson
(74) *Attorney, Agent, or Firm* — Knobbe, Martens, Olson & Bear, LLP

(57) ABSTRACT

A luminance equalization region is formed on one surface of an optical sheet incorporated into a liquid crystal display device to equalize luminance of a visible region of the liquid crystal display device. The luminance equalization region is in at least the visible region in a state in which the optical sheet is incorporated into the liquid crystal display device. The luminance equalization region in the visible region has a colored portion and a light-transmitting portion that surrounds the colored portion. The distance from an end of a display surface of the liquid crystal display device to an end of the visible region is 10 mm or less.

14 Claims, 19 Drawing Sheets

FIG.23

| PRINT COLOR | PRINTING PATTERN | HOT SPOT HIDING EFFECT ||||  PRINT VISIBILITY |
| --- | --- | --- | --- | --- | --- | --- |
| | | MAXIMUM LUMINANCE OR MINIMUM LUMINANCE (cd) | STABLE LUMINANCE (cd) | LUMINANCE DIFFERENCE (%) | EVALUATION | |
| BLACK INK | SOLID (WITHIN BEZEL) | 5552 | 7702 | −28 | × | × |
| GRAY INK | NARROW SOLID + HIGH-DEFINITION DOTS (WITHIN BEZEL) | 9827 | 8197 | 17 | × | × |
| TRANSPARENT INK + BLACK BEADS (EX.1) | NARROW SOLID + HIGH-DEFINITION DOTS (WITHIN BEZEL) | 8360 | 7714 | 8 | ○ | ○ |
| TRANSPARENT INK + BLACK BEADS (EX.2) | NARROW SOLID + HIGH-DEFINITION DOTS (WITHIN AND OUTSIDE BEZEL) | 8037 | 7710 | 4 | ◎ | ○ |

FIG.27

| CONTENT OF COLORED PARTICLES (% BY MASS) | DOT DENSITY (AREAL PERCENTAGE OF DOT IN PRINTING PATTERN) | | | | | AREAL PERCENTAGE OF COLORED PORTION (DOT AREA RATIO) |
|---|---|---|---|---|---|---|
| | 5% | 10% | 20% | 30% | 35% | |
| 5% | ○ | ○ | ○ | ○ | ○ | 5% |
| 8% | ○ | ○ | ○ | ○ | ○ | 10% |
| 10% | ○ | ○ | × | × | × | 20% |
| 17% | ○ | × | × | × | × | 30% |
| 32% | ○ | × | × | × | × | 40% |
| 45% | ○ | — | — | — | — | 50% |
| 50% | — | — | — | — | — | — |

OPTICAL SHEET, BACKLIGHT UNIT, LIQUID CRYSTAL DISPLAY DEVICE, AND INFORMATION EQUIPMENT

CROSS-REFERENCE TO RELATED APPLICATION

This application claims priority to Japanese Patent Application No. 2018-191276 filed on Oct. 9, 2018, the entire disclosure of which is incorporated by reference herein.

BACKGROUND

The present disclosure relates to an optical sheet, a backlight unit, a liquid crystal display device, and information equipment.

In recent years, liquid crystal display devices (hereinafter sometimes referred to as liquid crystal displays) have been widely used as display devices for various information equipment, such as smartphones and tablet devices. Dominant types of liquid crystal displays include a direct-lit liquid crystal display including a light source disposed on the back surface of a liquid crystal panel, and a side-lit liquid crystal display including a light source disposed near one side surface of a liquid crystal panel.

In each of these liquid crystal displays, light leaking from the light source and hot spots, both of which are formed on a display surface (a display surface for a user), need to be reduced. The hot spots refer to a phenomenon in which a portion of the display surface becomes extremely bright due to the arrangement of the light source (e.g., a phenomenon in which if a plurality of LED units are used as the light source, regions of the display surface in the vicinity of the LED units become extremely bright).

To absorb light with extremely high intensity caused by light leaking from the light source or hot spots, a frame-shaped region that absorbs light (hereinafter referred to as the "bright line prevention region") is generally provided at four peripheral sides of an optical sheet, such as a diffusion sheet, incorporated into the liquid crystal display. Specific examples of the bright line prevention region include a frame-shaped black line printed on the four peripheral sides of the optical sheet, and black or gray dots printed on the four peripheral sides of the optical sheet.

For example, Japanese Unexamined Patent Publication No. 2001-297615 discloses an optical sheet which has a bright line prevention region comprised of dots formed by gradation printing and having a gradually changed dot pattern, and in which a minimum diameter of the dots formed by the gradation printing is from 10 μm to 200 μm.

Japanese Patent No. 4638061 discloses an optical sheet including a bright line prevention region having a gradation region where a dot pattern is gradually changed to blur a boundary line between a region where a bright line prevention layer is stacked and a region where no bright line prevention layer is stacked. Here, dots forming the dot pattern have the same size, are substantially square, and are randomly arranged. The dots are arranged in the gradation region such that the number of the dots gradually decreases from the region where the bright line prevention layer is stacked toward the region where no bright line prevention layer is stacked.

SUMMARY

In recent years, an attempt has been made to reduce the width of a frame of a liquid crystal display (a bezel along four peripheral sides of a display surface) incorporated in information equipment, such as a smartphone or a tablet device, to increase the area of a display screen region (a region of the display surface except the frame).

However, if an attempt is made to reduce the width of the frame of the liquid crystal display, expansion and contraction of an optical sheet, the dimensional tolerances of each element, the positional accuracy of each element during assembly, and other factors cause the bright line prevention region (the black line or dots formed in the shape of a frame at four peripheral sides of the optical sheet) to appear also on the display screen region and visually recognized. This reduces the visibility of what is originally displayed. The bright line prevention region is visually recognized not only when the liquid crystal display is viewed from the front but also when the liquid crystal display is viewed at an angle. Thus, the reduction in visibility described above occurs. This hinders the attempt to reduce the width of the frame to increase the area of the display screen region of the liquid crystal display.

It is therefore an object of the present disclosure to prevent a reduction in visibility while reducing the influence of light leakage and hot spots, even if the width of a frame of a liquid crystal display (a liquid crystal display device) is reduced.

In order to achieve the above object, an optical sheet according to an aspect of the present disclosure is directed to an optical sheet incorporated into a liquid crystal display device having a display surface, a distance from an end of the display surface to an end of a visible region of the display surface being 10 mm or less, wherein the optical sheet includes a luminance equalization region formed on one surface of the optical sheet to equalize luminance of the visible region, the luminance equalization region in its entirety or part is in at least the visible region in a state in which the optical sheet is incorporated into the liquid crystal display device, and the luminance equalization region in the visible region has a colored portion and a light-transmitting portion that surrounds the colored portion.

In the optical sheet according to the aspect of the present disclosure, the colored portion may include a plurality of colored particles. In this case, the light-transmitting portion may be a transparent ink.

In the optical sheet according to the aspect of the present disclosure, the luminance equalization region in the visible region may include a plurality of dots, and each of the dots may have the colored portion and the light-transmitting portion. In this case, a ratio of an area of the colored portion to an entire area of each dot may be 50% or less. Further, the ratio may be 30% or less, and an areal percentage of the dots may be 10% or less. The dots may be arranged by gradation near the end of the visible region.

In the optical sheet according to the aspect of the present disclosure, the colored portion may have a width from 10 μm to 40 μm.

In the optical sheet according to the aspect of the present disclosure, the colored portion may have an area from 50 μm² to 1300 μm².

In the optical sheet according to the aspect of the present disclosure, the luminance equalization region present in the visible region may include the colored portion which is comprised of a plurality of colored portions, and a distance between the colored portions may be greater than a width of each of the colored portions.

A backlight unit according to an aspect of the present disclosure is directed to a backlight unit incorporated into a liquid crystal display device having a display surface, the backlight unit being configured to guide light emitted from a light source to the display surface, the backlight unit comprising: the above-described optical sheet according to the aspect of the present disclosure.

A liquid crystal display device according to an aspect of the present disclosure includes: the above-described backlight unit according to the aspect of the present disclosure; and a liquid crystal display panel.

Information equipment according to an aspect of the present disclosure includes the liquid crystal display device according to the aspect of the present disclosure.

According to the present disclosure, a luminance equalization region is formed on one surface of an optical sheet to equalize luminance of a visible region of a liquid crystal display device. The luminance equalization region has a colored portion and a light-transmitting portion that surrounds the colored portion. This allows the colored portion of the luminance equalization region to absorb light with an extremely high intensity caused by light leaking from a light source of the liquid crystal display device or hot spots. As a result, the luminance of the visible region in the vicinity of a light incident portion, on which light is incident from the light source, can be equalized and stabilized.

In addition, according to the present disclosure, although the luminance equalization region is defined by the light-transmitting portion as well, the light-transmitting portion itself is difficult to visually recognize. Further, since the colored portion is surrounded by the light-transmitting portion, the colored portion is necessarily prevented from being formed across the luminance equalization region, and has a smaller dimension than the luminance equalization region. As a result, the dimension of the colored portion which may be undesirably visible is made smaller than the total width (external dimension) of the luminance equalization region, and the colored portion is surrounded by the light-transmitting portion which is difficult to visually recognize, thereby reducing the visibility of the colored portion.

Accordingly, in situations such as a situation where the width of a frame of a liquid crystal display is reduced (in particular, in a situation where an optical sheet is incorporated into a liquid crystal display device having a display surface, the distance from an end of which to an end of a visible region of the display surface is 10 mm or less), even if the luminance equalization region in its entirety and part is in the visible region of the liquid crystal display device, the luminance equalization region including the light-transmitting portion and the colored portion described above is difficult to visually recognize as a whole. This can prevent a decrease in visibility of the liquid crystal display device.

As described above, according to the present disclosure, it is possible to substantially prevent a reduction in visibility, while reducing the influence of the light leakage and hot spots, even if the size of the frame of the display surface of the liquid crystal display device is reduced. Thus, reducing the size of the frame of the display surface without changing the size of the liquid crystal display device itself can increase the size of the visible region, i.e., a display screen region. The terms "visible region" and "display screen region" are used herein to express the same meaning.

BRIEF DESCRIPTION OF THE DRAWINGS

FIG. 23 is a table showing hot spot hiding effects provided by the first and second examples.

FIG. 27 is a table showing the results of evaluating the visibility of the first example.

DETAILED DESCRIPTION

An optical sheet, a backlight unit, a liquid crystal display device, and information equipment according to an embodiment of the present disclosure will now be described with reference to the drawings. Note that the scope of the present disclosure is not limited to the following embodiments, and changes and modifications may be optionally made without departing from the scope or spirit of the present disclosure.

Figure 1:
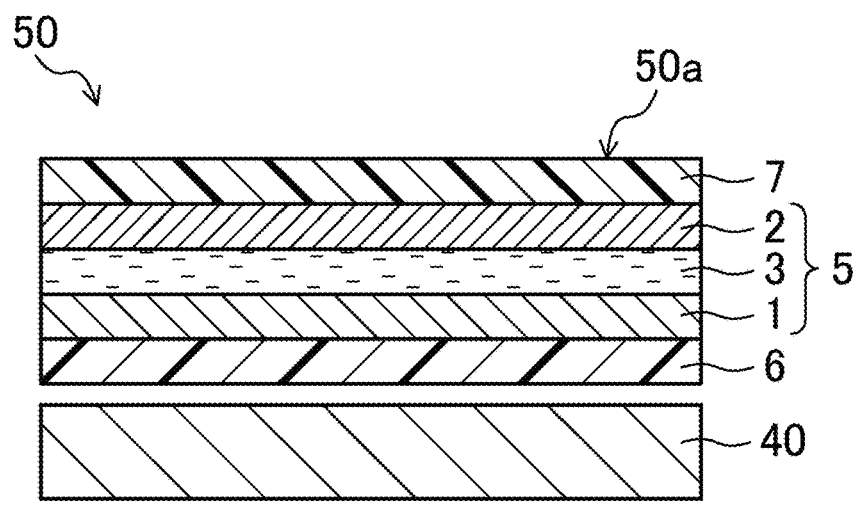
FIG. 1 is a cross-sectional view of a liquid crystal display device according to an embodiment.
Figure 2:
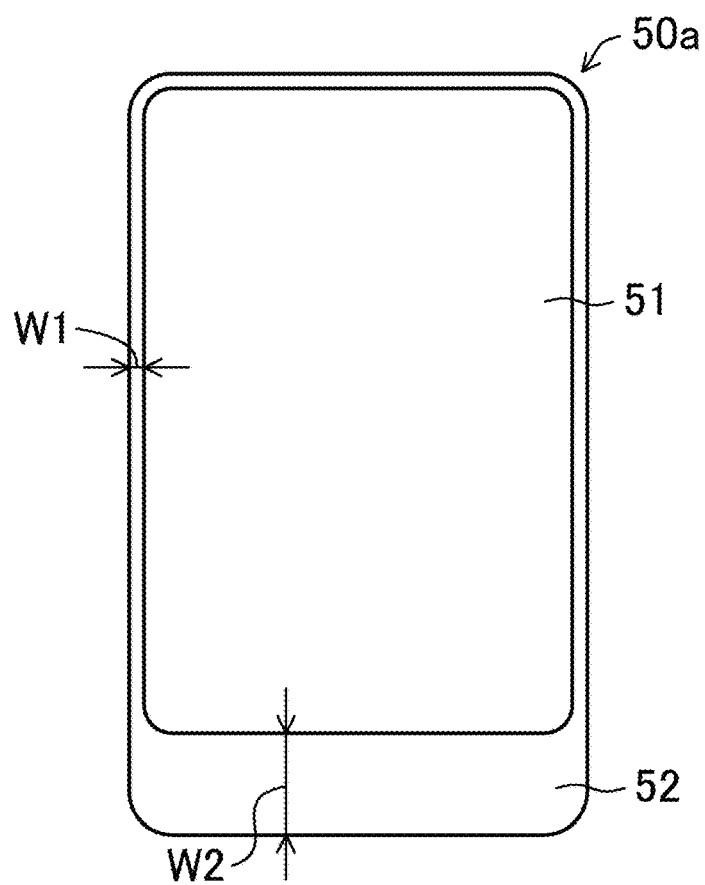
FIG. 2 is a plan view of the liquid crystal display device according to the embodiment.
Figure 3:
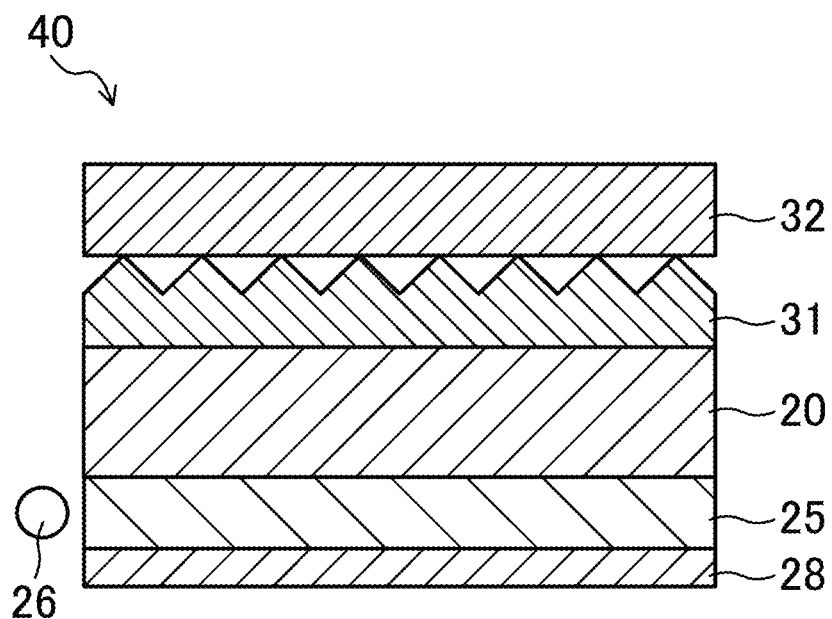
FIG. 3 is a cross-sectional view of a backlight unit according to an embodiment.

FIGS. 1 and 2 are respectively a cross-sectional view and a plan view of an exemplary liquid crystal display device according to this embodiment. FIG. 3 is a cross-sectional view of an exemplary backlight unit according to this embodiment.

As shown in FIG. 1, a liquid crystal display device 50 includes a liquid crystal display panel 5, a first polarizing plate 6 attached to a lower surface of the liquid crystal display panel 5, a second polarizing plate 7 attached to an upper surface of the liquid crystal display panel 5, and a backlight unit 40 provided on the back surface of the liquid crystal display panel 5 with the first polarizing plate 6 interposed therebetween. The liquid crystal display panel 5 includes a thin film transistor (TFT) substrate 1 and a color filter (CF) substrate 2 facing each other, a liquid crystal layer 3 provided between the TFT substrate 1 and the CF substrate 2, and a sealant (not shown) formed in the shape of a frame to seal the liquid crystal layer 3 between the TFT substrate 1 and the CF substrate 2.

As shown in FIG. 2, a display surface 50*a* of the liquid crystal display device 50 has a visible region (a region to be recognized as a display screen by a user of the liquid crystal display device 50) 51 and an end region (frame) 52 surrounding the visible region 51. Here, for example, the width W1 of portions of the end region 52 located on the upper, left, and right sides of the display surface 50*a* in the drawing is smaller than the width W2 of a portion of the end region 52 located on the lower side of the display surface 50*a* in the drawing. The shape of the display surface 50*a* as viewed from the front is generally rectangular, but this shape is merely an example of the present disclosure. The shape of the display surface 50*a* may be a rectangular shape having round corners, an elliptical shape, a circular shape, a trapezoidal shape, or any other shape.

The liquid crystal display device 50 of this embodiment is used as a display device that can be incorporated into various information equipment (e.g., an in-vehicle device, such as a car navigation system, a personal computer, a mobile phone, a personal digital assistant, a portable game console, a copying machine, a ticket machine, and an automatic teller machine).

The TFT substrate 1 includes, for example, a plurality of TFTs arranged in a matrix on a glass substrate, an interlayer insulating film covering the TFTs, a plurality of pixel electrodes arranged in a matrix on the interlayer insulating film and respectively connected to the TFTs, and an alignment film covering the pixel electrodes. The CF substrate 2 includes, for example, a grid-like black matrix provided on a glass substrate, color filters including red, green and blue layers each provided in a space surrounded by bars of the grid of the black matrix, a common electrode covering the black matrix and the color filter, and an alignment film covering the common electrode. The liquid crystal layer 3 is made of a nematic liquid crystal material or any other suitable material including liquid crystal molecules having electro-optical properties. The first and second polarizing plates 6 and 7 each include, for example, a polarizer layer having a polarizing axis in one direction, and a pair of protective layers between which the polarizer layer is sandwiched.

As shown in FIG. 3, the backlight unit 40 includes a diffusion sheet 20, a first prism sheet 31 and a second prism sheet 32 sequentially provided above the diffusion sheet 20, a light guide plate 25 provided under the diffusion sheet 20, a plurality of light sources (point light sources) 26 provided on a side of the light guide plate 25, and a reflection sheet 28 provided under the light guide plate 25. The light sources 26 are, for example, light-emitting diodes (LEDs). If LEDs are used as the light sources 26, a plurality of LED chips of several millimeters square are arranged at regular intervals. In this case, it is inevitable that the luminance of a region between one of the LED chips and another one of the LED chips varies. As a result, hot spots also tend to be formed. Thus, the usefulness of the present disclosure is more distinct in a case in which a plurality of LED chips are arranged at regular intervals as the light sources 26.

The diffusion sheet 20 includes, for example, a resin base layer, a light diffusion layer provided on an upper surface of the resin base layer, and an anti-sticking layer provided on a lower surface of the resin base layer. The first and second prism sheets 31 and 32 are, for example, acrylic resin films having a cross section in which a plurality of isosceles triangular grooves are arranged side by side. The vertical angle of a prism defined by an adjacent pair of the grooves is about 90°. Here, the grooves formed in the first prism sheet 31 are positioned to be orthogonal to the grooves formed in the second prism sheet 32. The first and second prism sheets 31 and 32 may be integrated together. The light guide plate 25 is formed in the shape of a rectangular plate, and is made, for example, of a transparent resin, such as an acrylic resin or a polycarbonate resin. In this embodiment, a surface of the light guide plate 25 toward the reflection sheet 28 has a pattern of white dots printed thereon to uniformly emit light from the entire surface. The light sources 26 are aligned side by side along the side surface of one of the short sides of the light guide plate 25. The reflection sheet 28 is configured, for example, as a film made of a white polyethylene terephthalate resin, an evaporated silver film, or any other suitable film.

The liquid crystal display device 50 described above displays an image in the following manner. Specifically, in a sub-pixel corresponding to each pixel electrode, a voltage having a predetermined magnitude is applied to the liquid crystal layer 3 to change the state of alignment of the liquid crystal layer 3, and light entering the liquid crystal layer 3 from the backlight unit 40 through the first polarizing plate 6 is emitted out through the second polarizing plate 7 with its transmittance adjusted.

One of the features of this embodiment is that one surface of an optical sheet incorporated into the liquid crystal display device 50 which has the display surface 50*a*, the distance from an end of which to an end of the visible region 51 of the display surface 50*a* (the shortest distance (in FIG. 2, the width W1) if the distance varies) is 10 mm or less, has the luminance equalization region intended to equalize the luminance of the visible region 51. The luminance equalization region is positioned in at least the visible region 51 in a state in which the optical sheet is incorporated into the liquid crystal display device 50. The luminance equalization region in the visible region 51 has a colored portion and a light-transmitting portion that surrounds the colored portions.

Light leakage and uneven luminance distribution are more likely to occur not only in the visible region on the side toward the LED light sources but also in the visible region on the side opposite to the LED light sources, and in both of the other sides of the visible region. This is because light emitted from the LED light sources is transmitted through a light guide material, such as a light guide plate (LGP) and a light guide film (LGF), and is reflected by the frame. It is therefore more likely that the light leaks locally from the end portions. Reducing the width of the frame may further cause leakage of light. In some cases, it is required that each of the four sides (the side toward the LED light sources, the side opposite to the LED light sources, and both of the other sides) have a luminance equalization region.

The "optical sheet" as used herein means a sheet having various optical functions such as diffusion, light collection, and refraction, and specifically corresponds to a diffusion sheet, a prism sheet, or any other suitable sheet.

The "visible region" as used herein refers to all regions of the liquid crystal display that can be visually recognized by the user viewing the liquid crystal display. Thus, the visible region includes not only a region of the liquid crystal display that can be visually recognized by the user viewing the liquid crystal display from the front, but also a region that can be visually recognized by the user viewing the liquid crystal display at an angle. This is because the user does not always visually recognize the liquid crystal display from the front, but may also visually recognize the liquid crystal display at an angle. Thus, the "visible region" overlaps with an end portion, toward the display screen, of the bezel (frame) of the liquid crystal display.

In addition, the phrase "equalize the luminance of the visible region" as used herein does not necessarily include completely equalizing the luminance of the visible region. More specifically, the phrase "equalize the luminance of the visible region" means that the luminance of a region of the visible region distant from or close to the light sources is equalized to the extent that when the user views the visible region, display screen flickers and non-uniform luminance distribution cannot be recognized irrespective of the distance from the light sources.

Whether or not the luminance of the visible region has been equalized may be determined in the following manner. Specifically, for example, optionally selected several people may check the visible region with the naked eyes, and determine if there is anything annoying on the screen display as a commercially available product. Specifically, for example, if 70% of the subjects indicate that "there is nothing that annoys," a determination may be made that "the luminance of the visible region has been equalized." Alternatively, as in the example described below, a measuring instrument may be used to determine whether the luminance of the visible region has been equalized or not.

The "luminance equalization region" as used herein may be any region having the function of contributing to equalization of the luminance of the visible region. In this embodiment, a "luminance equalization region" is configured to have colored portions and a light-transmitting portion that surrounds the colored portions. If "the entirety or part of the luminance equalization region is positioned in the visible region in a state in which the optical sheet is incorporated into the liquid crystal display device," a very strong demand arises that the luminance equalization region in the visible region" be less likely to be visually recognized by the user who visually recognizes the visible region of the display surface. In such a case, employment of one or more embodiments disclosed herein is more effective.

Figure 4:
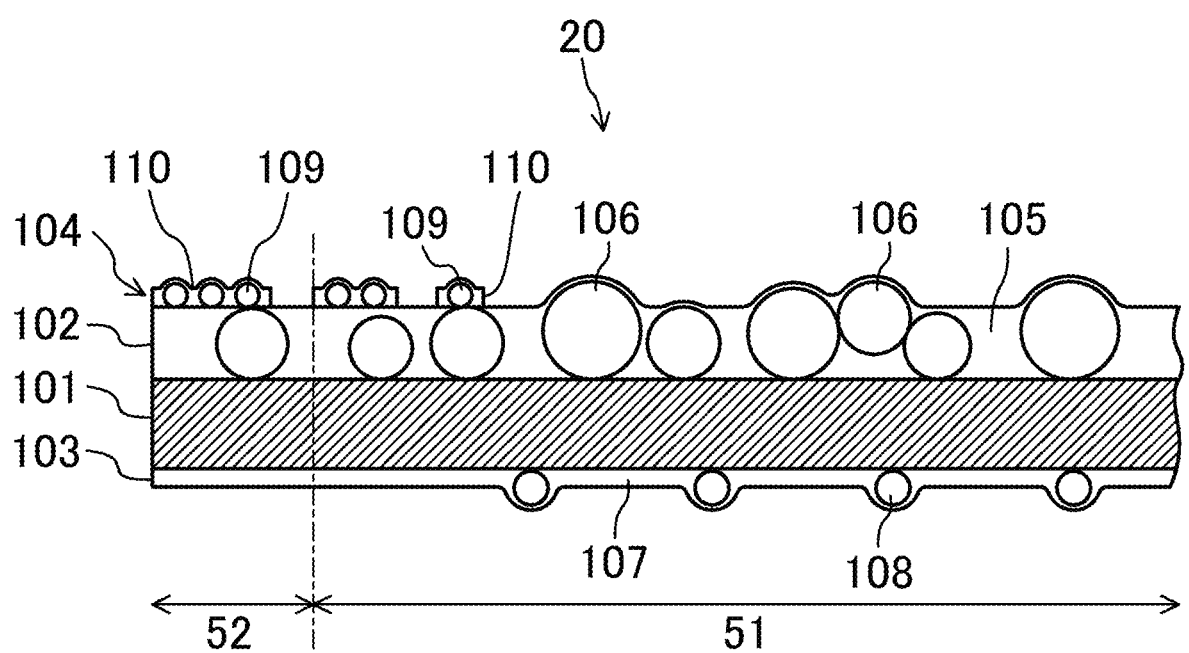
FIG. 4 is a cross-sectional view of an optical sheet according to an embodiment.
Figure 5:
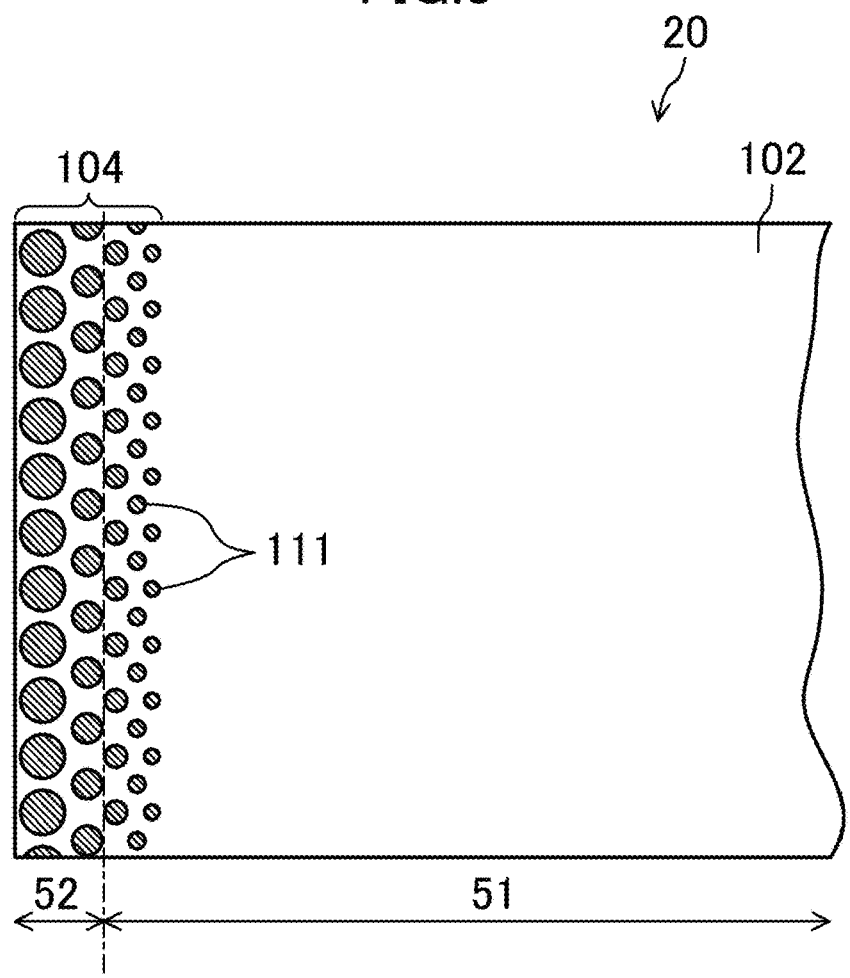
FIG. 5 is a plan view of the optical sheet according to the embodiment.

A preferred example will now be described, in which the surface of the diffusion sheet 20 forming part of the backlight unit 40 shown in FIG. 3 has a "luminance equalization region." FIGS. 4 and 5 are a cross-sectional view and a plan view, respectively, of an exemplary preferable optical sheet (the diffusion sheet 20 forming part of the backlight unit 40) according to this embodiment.

As shown in FIG. 4, the diffusion sheet 20 includes a base layer 101, a light diffusion layer 102 provided on a front surface of the base layer 101, and an anti-sticking layer 103 provided on a back surface of the base layer 101. A luminance equalization region 104 is layered on the outermost surface, toward the front, of the diffusion sheet 20.

The base layer 101 is made of a transparent and particularly colorless synthetic resin, because the base layer 101 needs to transmit light beams. Non-limiting examples of the synthetic resin for use as the base layer 101 include polyethylene terephthalate, polyethylene naphthalate, acrylic resin, polycarbonate, polystyrene, polyolefin, cellulose acetate, and weather-resistant vinyl chloride. The thickness of the base layer 101 should not be specifically limited, but may be, for example, from 10 µm to 500 µm.

The light diffusion layer 102 includes a binder 105 and beads 106 dispersed in the binder 105. The dispersed beads 106 allow light beams passing through the light diffusion layer 102 from the back side to the front side of the light diffusion layer 102 to be uniformly diffused. The beads 106 may include beads, upper ends of which project out from the binder 105, and beads embedded in the binder 105. Such beads allow light beams to be more successfully diffused. The thickness of the light diffusion layer 102 (the thickness of the binder 105 except the beads 106) should not be specifically limited, but may be, for example, from about 1 µm to about 30 µm.

Examples of polymers for use as the binder 105 include acrylic resin, polyurethane, polyester, fluorine resin, silicone resin, polyamide-imide, and epoxy resin. The binder 105 may contain, in addition to the aforementioned polymer, a plasticizer, a stabilizer, an antidegradant, a dispersant, and any other suitable agent.

The beads 106 are substantially spherical, and examples of materials of the beads 106 include acrylic resin, polyurethane, polyvinyl chloride, polystyrene, polyacrylonitrile, and polyamide. The particle size of the beads 106 may be, for example, from 0.1 µm to 100 µm. The content of the beads 106 in 100 parts by weight of the polymer in the binder 105 may be, for example, from 0.1 parts by weight to 500 parts by weight.

The anti-sticking layer 103 includes a binder 107 and beads 108 dispersed in the binder 107. The beads 108 in the anti-sticking layer 103 raise portions of the surface of the binder 107. Sticking of the anti-sticking layer 103 to the light guide plate 25 (see FIG. 3) is therefore prevented. The materials of the binder 107 and the beads 108 forming the anti-sticking layer 103 may be the same as, or similar to, those of the binder 105 and the beads 106 of the light diffusion layer 102 described above. However, since the content of the beads 108 is relatively low, the beads 108 are dispersed in the binder 107 while being spaced apart from each other. The thickness of the anti-sticking layer 103 (the thickness of the binder 107 except the beads 108) should not be specifically limited, but may be, for example, from about 1 µm to about 10 µm. The large number of beads 108 in the anti-sticking layer 103 raise portions of the surface of the binder 107. Sticking of the anti-sticking layer 103 to the light guide plate 25 is therefore prevented.

The luminance equalization region 104 is layered on the front surface of the light diffusion layer 102 from a region where a bright line is generated (for example, the end region 52 toward the light sources 26) to a portion of the visible region 51 adjacent to the end region 52. The luminance equalization region 104 has colored portions 109 and a light-transmitting portion 110 that surrounds the colored portions 109. The luminance equalization region 104 may include a plurality of dots 111, as shown, for example, in FIG. 5. The dots 111 may be arranged near the edge of an end portion of the visible region 51 in a gradation so that the width of the dots 111 gradually decreases. More specifically, the width of the dots 111 may be gradually reduced from the end region 52 toward the visible region 51. As a result, the dots 111 may be arranged in a gradation. Arranging the dots 111 in a gradation near the edge of the end portion of the visible region 51 makes it difficult to visually recognize the luminance equalization region 104 (in particular, the luminance equalization region 104 in the visible region 51). To provide such an advantage, a region "near the edge of the end portion of the visible region 51" is defined to accord with the definition of the "visible region" as used herein, and conceptually includes not only the luminance equalization region 104 arranged within the user's visual field when the user views the liquid crystal display from the front, but also the luminance equalization region 104 that can be visually recognized when the user views the liquid crystal display at an angle.

Each of the dots 111 includes a colored portion 109, and a light-transmitting portion 110 that surrounds the colored portion 109. The dots 111 have a size that decreases in a direction away from the end region 52, for example.

Figure 6:
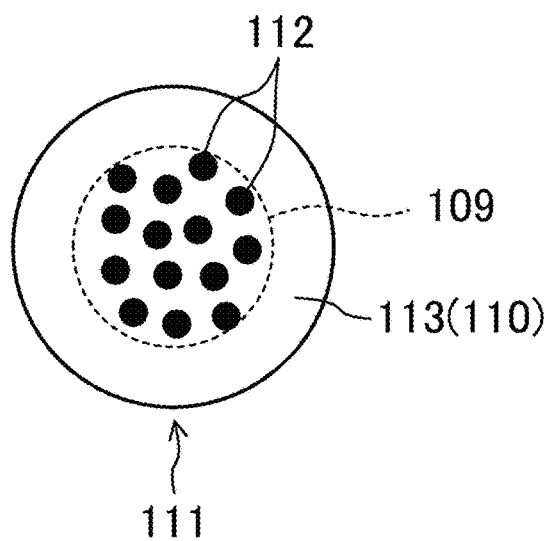
FIG. 6 is a plan view schematically showing one of dots forming part of a luminance equalization region of the optical sheet according to the embodiment.

FIG. 6 is a plan view schematically showing an exemplary dot 111 forming part of the luminance equalization region 104 according to this embodiment. As shown in FIG. 6, the colored portion 109 of the dot 111 includes a plurality of colored particles 112. The colored portion 109 of the dot 111 is defined as a circle surrounding a region where the colored particles 112 are present and aggregated. A transparent ink 113 is present between the colored particles 112 in the colored portion 109; however, in the present disclosure, such a region where a plurality of colored particles 112 are observed as being collected or aggregated is defined as the "colored portion." Preferably, the dot 111 may include a plurality of colored particles 112 forming the colored portion 109, and the transparent ink 113 surrounding the aggregates of the colored particles 112 and serving as the light-transmitting portion 110. The "transparent ink" as used herein does not refer to a so-called liquid ink, but refers to a solid material having the property of transmitting light, such as a thermosetting resin or a thermoplastic resin.

In this embodiment, the luminance equalization region 104 includes a plurality of dots 111, each of which includes the colored portion 109 and the light-transmitting portion 110 that surrounds the colored portion 109. This can provide the following advantages.

Specifically, since the colored portion 109 of each of the dots 111 formed in the luminance equalization region 104 absorbs light with an extremely high intensity caused by light leaking from the light sources 26 or hot spots, the luminance of the visible region 51 in the vicinity of a light incident portion on which light is incident from the light sources 26 can be equalized and stabilized.

The outline (outer shape) of the dots 111 formed in the luminance equalization region 104 is defined by the light-transmitting portion 110. However, the light-transmitting portion 110 itself is difficult to visually recognize. Further, since the colored portion 109 is surrounded by the light-transmitting portion 110, the dimension of the colored portion 109 is smaller than the external dimension of the luminance equalization region 104 and the width of each of the formed dots 111. Thus, sufficiently reducing the external dimension of the luminance equalization region 104 and the width of each of the formed dots 111 allows the colored portion 109 to have a dimension that makes it difficult to visually recognize the colored portion 109. Accordingly, even if the entirety or part of the luminance equalization region 104 is in the visible region 51 of the liquid crystal display device 50, the luminance equalization region 104 including the dots 111 having the light-transmitting portion 110 and the colored portion 109 is difficult to visually recognize as a whole. This can prevent a reduction in visibility of the liquid crystal display device 50.

As described above, according to this embodiment, even if the size of the frame of the display surface 50a of the liquid crystal display device 50 is reduced, a reduction in visibility can be prevented while reducing the influence of light leakage and hot spots. Thus, reducing the size of the frame (the end region 52) of the display surface 50a without changing the size of the liquid crystal display device 50 itself can increase the size of the visible region 51, i.e., the display screen region. The present disclosure is therefore useful as a liquid crystal display device in which the width of a frame of the display surface 50a (the distance from the end of the display surface 50a to the end of the visible region 51) is small. The width is, for example, 10 mm or less, preferably 5 mm or less, more preferably 2 mm or less, further preferably 0.5 mm or less, and most preferably zero.

In this embodiment, the colored portion 109 means a portion absorbing light with an extremely high intensity caused by light leaking from the light sources 26 or hot spots as described above. More specifically, the colored portion 109 is, for example, a portion observed, by an optical microscope, as a region (a colored region (image)) which is less likely to transmit light from a reflector of the optical microscope or a light source lamp. The colored portion 109 may be colored entirely, or may be formed as an aggregate of the colored particles 112 (see FIG. 6). It is recommended that the colored portion 109 be formed as an aggregate of the colored particles 112. This is because the colored portion 109 formed as an aggregate of the colored particles 112 is difficult to observe as a large point by the user viewing the liquid crystal display device 50, and is thus less likely to be visually recognized by the user. In addition, if the colored portion 109 is comprised of the colored particles 112, the anti-sticking effects with another element are more improved by the colored particles 112.

If the colored portion 109 is comprised of a plurality of colored particles 112 collected together, it is recommended that the colored particles 112 be aggregated in the dot 111, rather than dispersed uniformly in the dot 111. The reason for this is that efficiencies of scale obtained by the aggregation of the plurality of colored particles 112 contribute to absorbing more light with an extremely high intensity caused by light leaking from the light sources 26 and hot spots, compared to the case in which the colored particles 112 are dispersed. Besides, even if the colored particles 112 are aggregated, the states of the individual particles 112 are maintained, which keeps the low visibility of the particles 112. The term "aggregate" as used herein means both of a state in which fine particles are brought into contact with one another and a state in which fine particles are close to one another. Fine particles exert a force to one another. This property is referred to as aggregability. The van der Waals force, an electrostatic force, a liquid cross-linking force, and other forces are exerted among the fine particles to develop a cohesive force.

The material of the colored portion 109 (colored particles 112) may be any material that can absorb light. Examples of the material include colored beads made of urethane, silica, acryl, or nylon (black beads, red beads, blue beads, white beads, and a mixture of colored beads having a plurality of colors). Alternatively, inorganic fine particles of aluminum, carbon, titanium oxide, iron oxide, or any other suitable material may be used as the colored particles 112.

Further, as described above, the light-transmitting portion 110 is a region surrounding the colored portion 109 in dimension that is difficult to visually recognize. The light-transmitting portion 110 is preferably transparent to the light from the light sources 26 to make it difficult to visually recognize the light-transmitting portion 110 itself as well. Specifically, the light-transmitting portion 110 is, for example, a portion observed, if an optical microscope is used to observe the luminance equalization region 104, as a region which transmits light from a reflector of the optical microscope or a light source lamp. In other words, the light-transmitting portion 110 is not necessarily a region or a portion which completely transmits light. The transparent ink 113 may be used as the light-transmitting portion 110 as described above. In this case, when observed using, for example, a digital microscope in a light transmission mode and in a luminance mode, the light-transmitting portion 110 looks white, while the colored portion 109 looks black.

The light-transmitting portion 110 refers to a region made of a material having a higher light transmittance than the colored portion 109. If a black material having high hidability is used as the colored portion 109, a transparent ink, a white ink, a gray ink, or any other suitable ink having a higher light transmittance than the colored portion 109 can be used as the light-transmitting portion 110.

If the transparent ink 113 is used as the light-transmitting portion 110, the material thereof should not be specifically limited, but may be, for example, acryl, polyester, vinyl, urethane acrylate, silicon, cellulose, epoxy, phenol, or any other suitable material.

The dots 111 in the luminance equalization region 104 can be formed by printing. Specifically, the colored particles 112 forming part of each dot 111 are dispersed in an ultraviolet curable resin, a resin requiring heat, or a resin that is more easily curable with the use of heat, thereby obtaining an ink, which is used in printing. If the particles are dispersed in the ultraviolet curable resin, the ink is irradiated with ultraviolet light. If the particles are dispersed in the resin requiring heat, hot air is blown on the ink. If the particles are dispersed in the resin that is more easily curable with the use of heat, the ink is dried at normal temperature or with hot air. As a result, the dots 111 can be cured. Examples of the printing method include screen printing (porous printing), gravure printing (intaglio printing), flexography or typography (relief printing), and offset printing (planography), which are classified into analog printing, ink-jet printing and laser printing, which are classified into digital printing, and hybrid printing obtained by combining analog printing and digital printing together. A positive film forming machine (such as a setter) for use to make a printing plate may be used. Further, a combination of a technique related to the surface treatment of a printing target substrate with the various printing methods described above may improve the printing accuracy.

In this embodiment, the luminance equalization region 104 may have any configuration that can achieve the object of the present disclosure, but may have the following configuration.

1. <Configuration in which as Shown in, for Example, FIG. 5 Described Above, a Plurality of Dots 111 are Printed, as the Luminance Equalization Region 104, on a Region of the Optical Sheet (in this Embodiment, the Diffusion Sheet 20) in the Vicinity of the Light Sources 26 of the Liquid Crystal Display Device 50>

Figure 7:
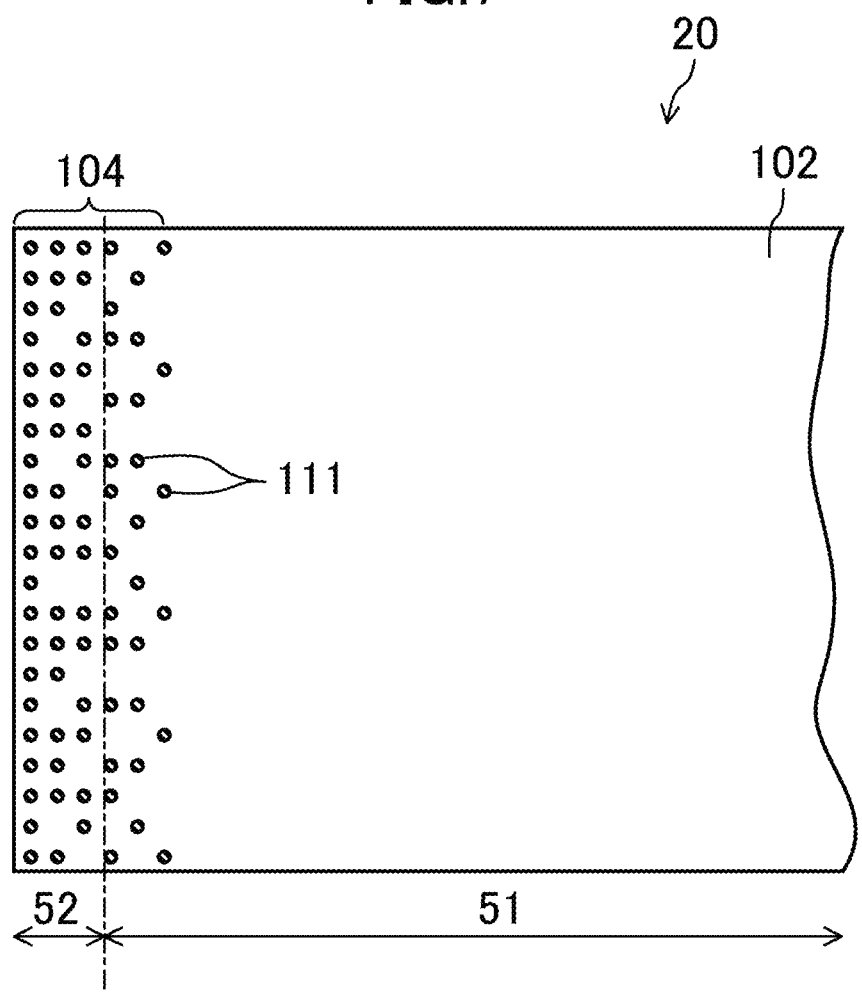
FIG. 7 is a plan view of an optical sheet according to a variation.

In the configuration shown in FIG. 5, the size of each of the dots 111 decreases in a direction away from the end region 52. However, alternatively, just like the configuration shown in, for example, FIG. 7, the dots 111 may have the same size, and the density (number per unit area) of the dots 111 arranged may decrease in the direction away from the end region 52. The dots 111 are arranged by gradation near the boundary between the end region 52 and the visible region 51, and the dimension or density of the dots 111 arranged in the end region 52 is made greater/higher than that of the dots 111 arranged in the visible region 51. This can ensure absorption of surplus light in the end region 52 where influence by the light leaking from the light sources 26 and hot spots is significant, and make it even less likely that the dots 111 arranged in the visible region 51 are visually recognized.

If the dots 111 are arranged by gradation, amplitude modulation (AM) may be used to arrange the dots in a regular manner while changing the diameter of the dots, or frequency modulation (FM) may be used to arrange the dots in a random manner while maintaining a constant diameter of the dots.

Alternatively, the dots 111 may have the same size, and the height of the dots 111 may be randomly changed. The relatively high dots 111 also make it possible to facilitate the prevention of sticking of the diffusion sheet 20 to the first prism sheet 31 (see FIG. 3).

Figure 8:
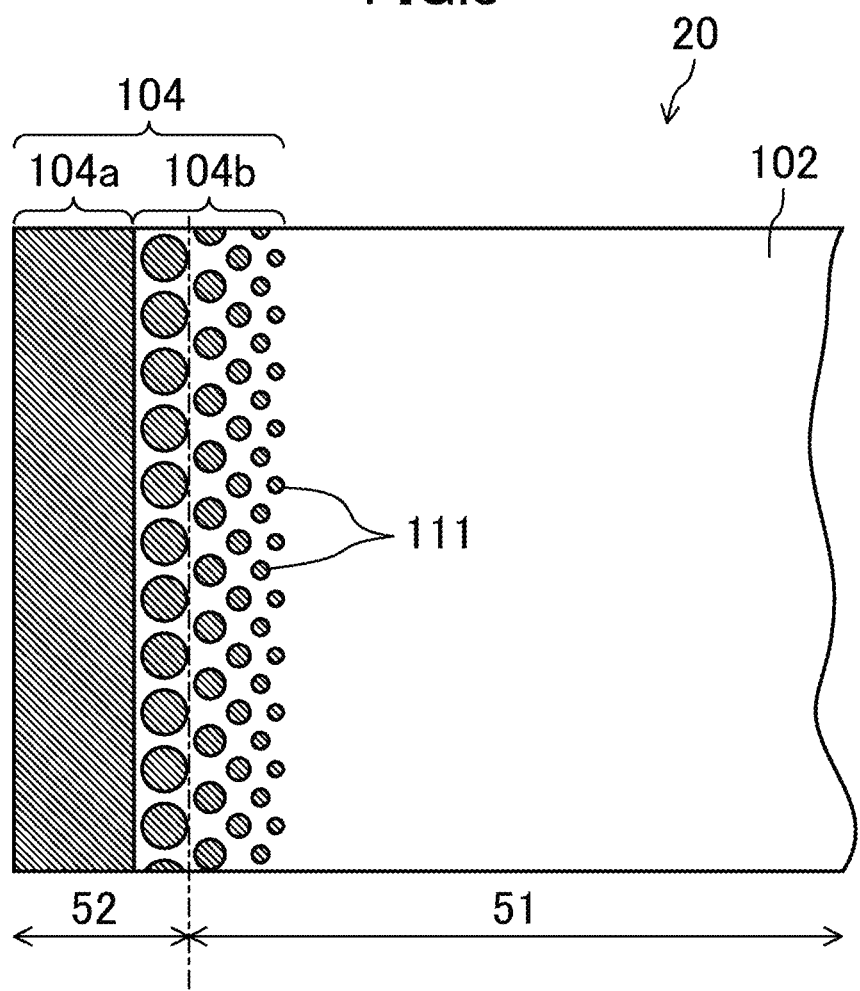
FIG. 8 is a plan view of an optical sheet according to another variation.

2. <Configuration in which as Shown in, for Example, FIG. 8, a First Luminance Equalization Region 104a is Printed in a Band-Like Shape on a Region of the Diffusion Sheet 20 Closest to the Light Sources 26, and a Plurality of Dots 111 are Printed as a Second Luminance Equalization Region 104b on a Region of the Diffusion Sheet 20 Adjacent to the First Luminance Equalization Region 104a>

In the configuration shown in FIG. 8, the first luminance equalization region 104a is arranged in the end region 52, and the dots 111 forming the second luminance equalization region 104b are arranged by graduation from the end region 52 to the visible region 51. The first luminance equalization region 104a may be made of a material different from that of the second luminance equalization region 104b, and may be formed by solid printing. In the configuration shown in FIG. 8, the size of each of the dots 111 forming the second luminance equalization region 104b decreases in a direction away from the end region 52. However, alternatively, the dots 111 may have the same size, and the density of the dots 111 arranged may decrease in the direction away from the end region 52.

Figure 9:
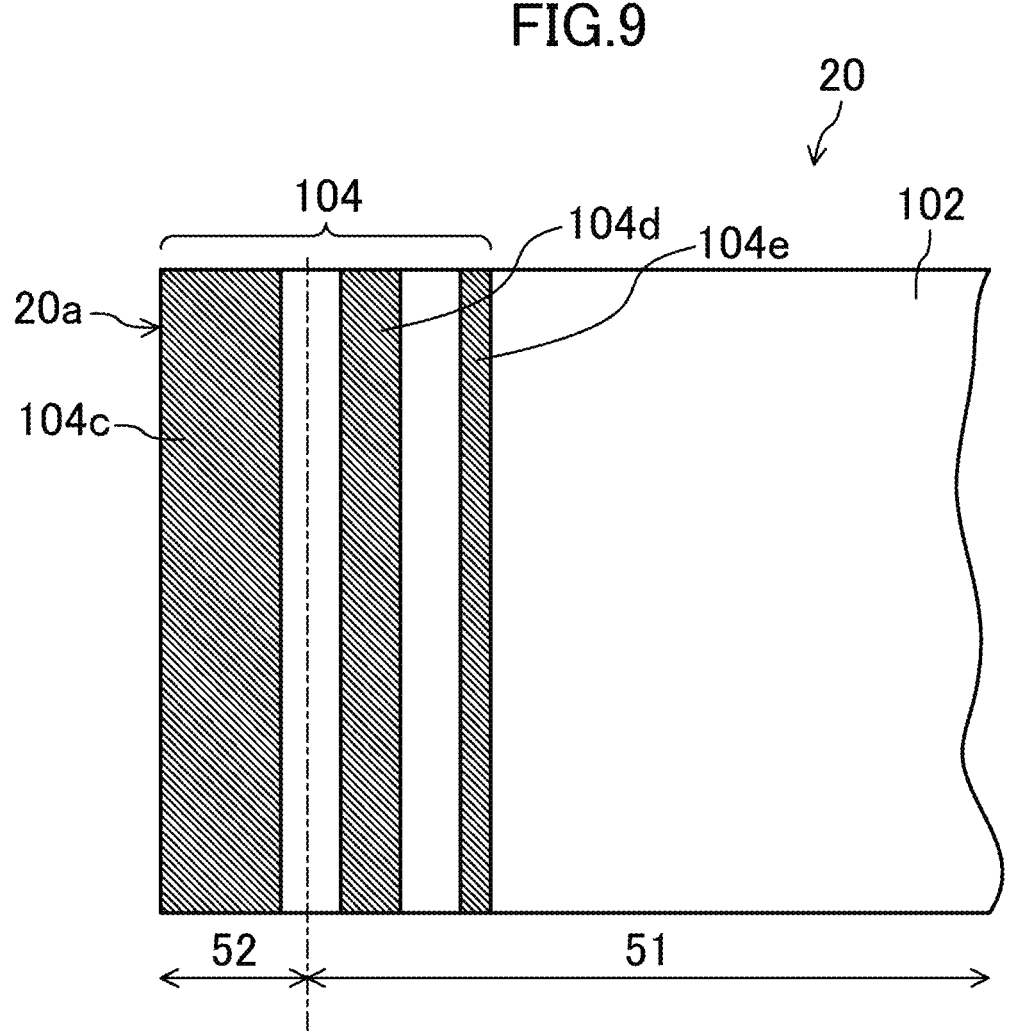
FIG. 9 is a plan view of an optical sheet according to still another variation.
Figure 11:
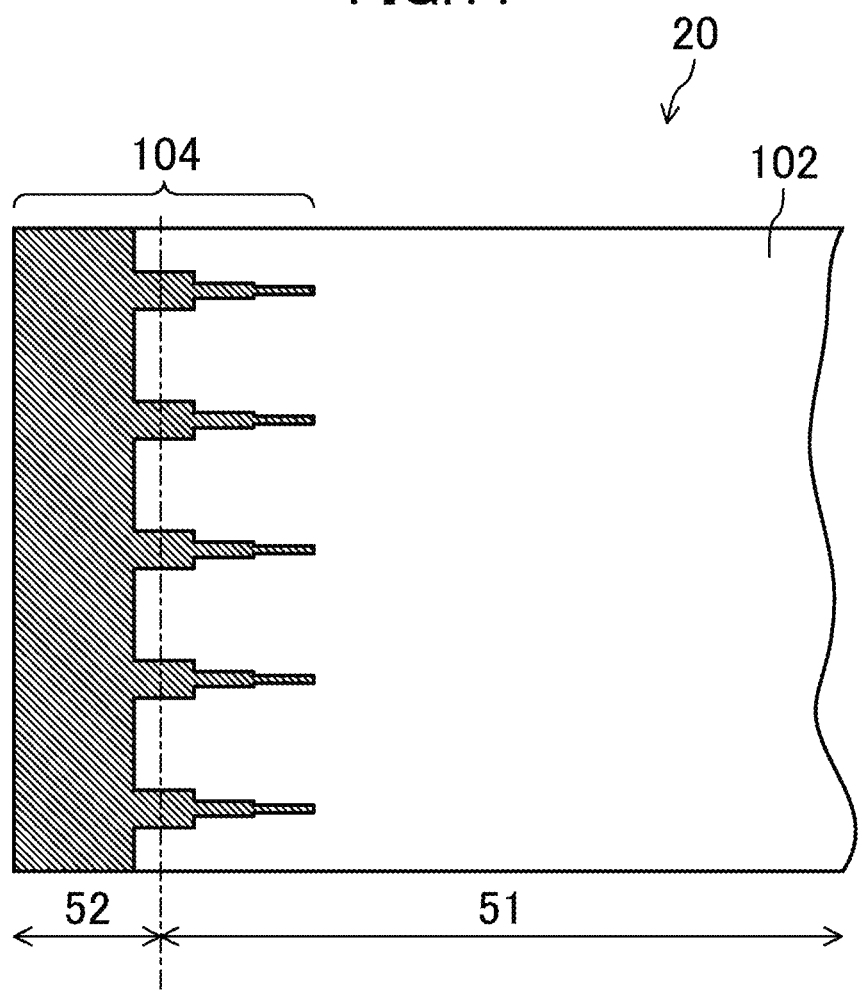
FIG. 11 is a plan view of an optical sheet according to a further variation.
Figure 12:
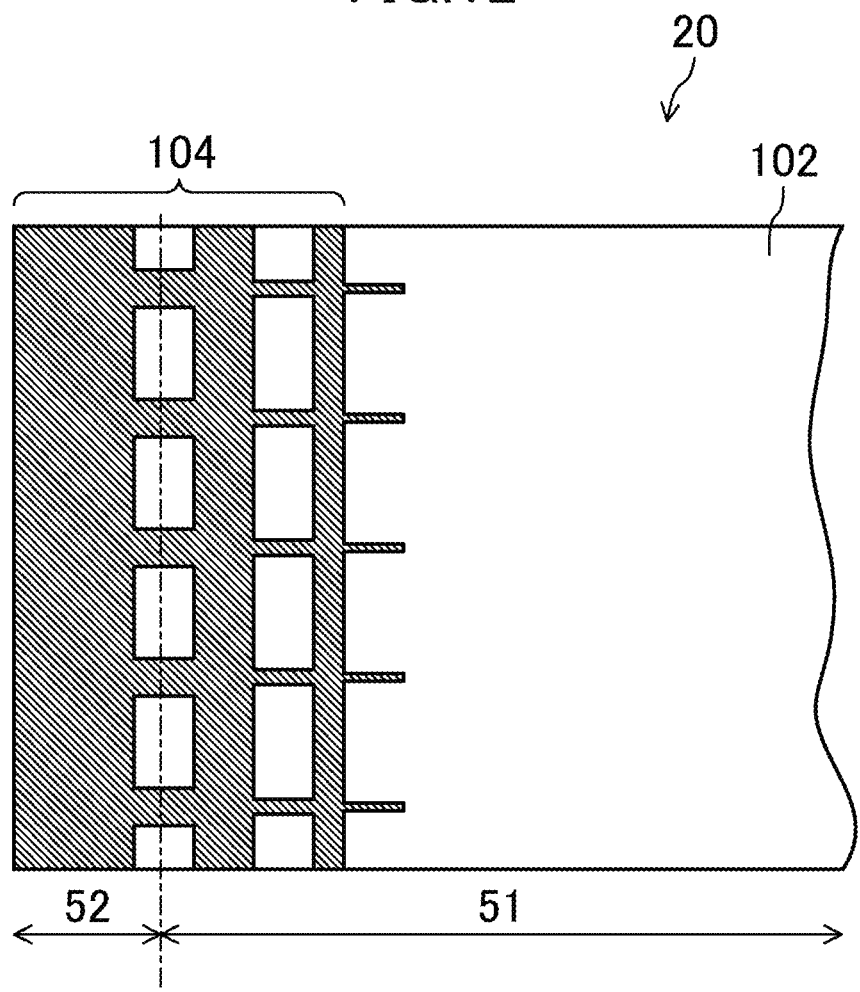
FIG. 12 is a plan view of an optical sheet according to a further variation.

3. <Configuration in which as Shown in, for Example, FIGS. 9, 11, and 12, a Luminance Equalization Region 104 is Printed in a Band-Like Shape or in a Grid Pattern on a Region of the Diffusion Sheet 20 in the Vicinity of the Light Sources 26>

Figure 10:
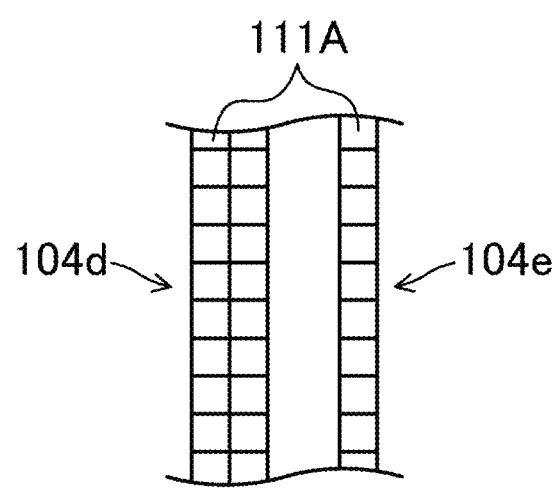
FIG. 10 is an enlarged plan view schematically showing a luminance equalization region of an optical sheet according to yet another variation.

In the configuration shown in FIG. 9, band-like luminance equalization regions 104c, 104d, and 104e are formed in the stated order from a side 20a of the diffusion sheet 20 closest to the light sources 26. These band-like luminance equalization regions 104c, 104d, and 104e are parallel to the side 20a of the diffusion sheet 20. The widths of the band-like luminance equalization regions 104c, 104d, and 104e decrease with an increasing distance from the side 20a. As shown in FIG. 10, the band-like luminance equalization regions 104d and 104e are arranged in the visible region 51, and may include a plurality of dots 111A arranged in a grid pattern. Here, since each dot 111A includes a colored portion 109 and a light-transmitting portion 110 that surrounds the colored portion 109, the band-like luminance equalization regions 104d and 104e are difficult to visually recognize, as described above. The band-like luminance equalization region 104c may be made of a material different from that of the band-like luminance equalization regions 104*d* and 104*e*, and may be formed by solid printing. Likewise, in the configurations shown in FIGS. 11 and 12 as well, portions of the luminance equalization region 104 in at least the visible region 51 may include a plurality of dots 111A arranged in a grid pattern, just like the configuration shown in FIG. 10.

In addition to the luminance equalization regions 104 shown in FIGS. 9, 11 and 12, for example, a luminance equalization region 104 having a band-like portion or a grid patterned portion having random lengths or widths, a luminance equalization region 104 having a band-like portion or a grid patterned portion extending obliquely with respect to the sides of the diffusion sheet 20, and other similar regions may also be used although not shown.

Figure 13:
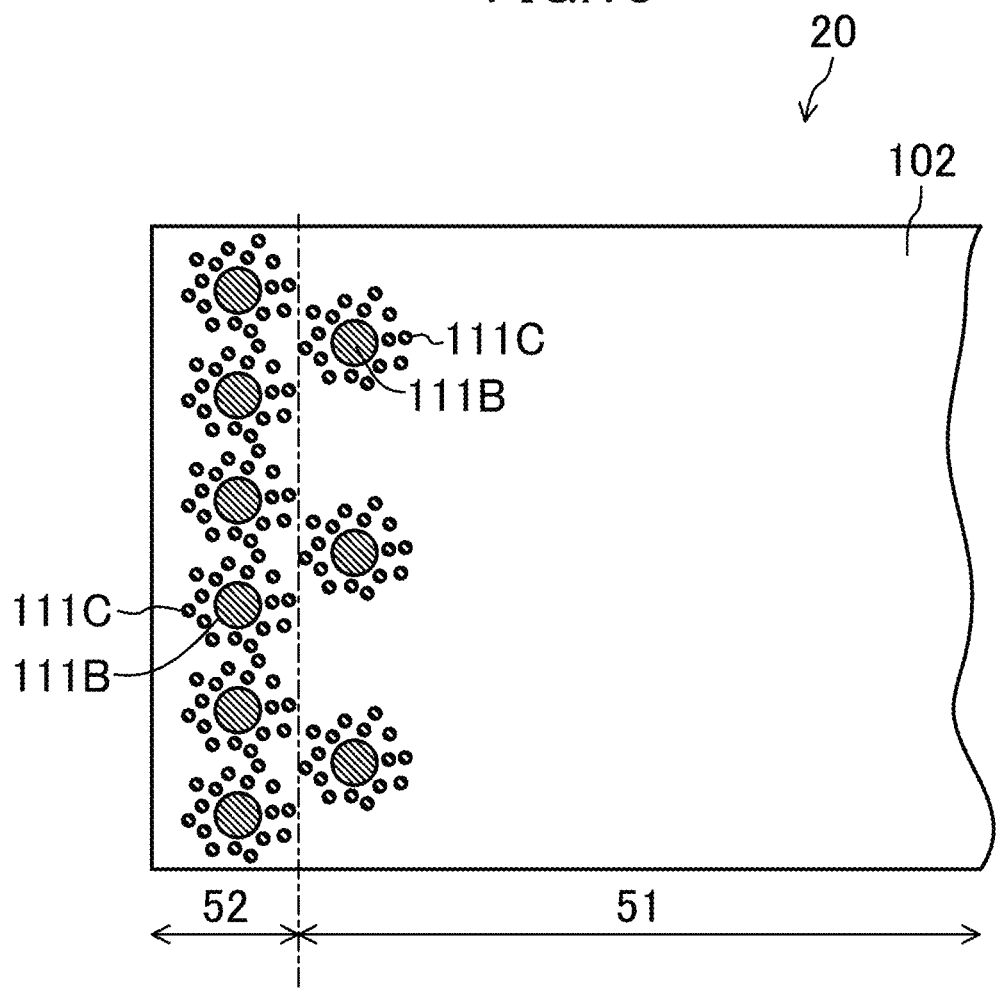
FIG. 13 is a plan view of an optical sheet according to a further variation.
Figure 14:
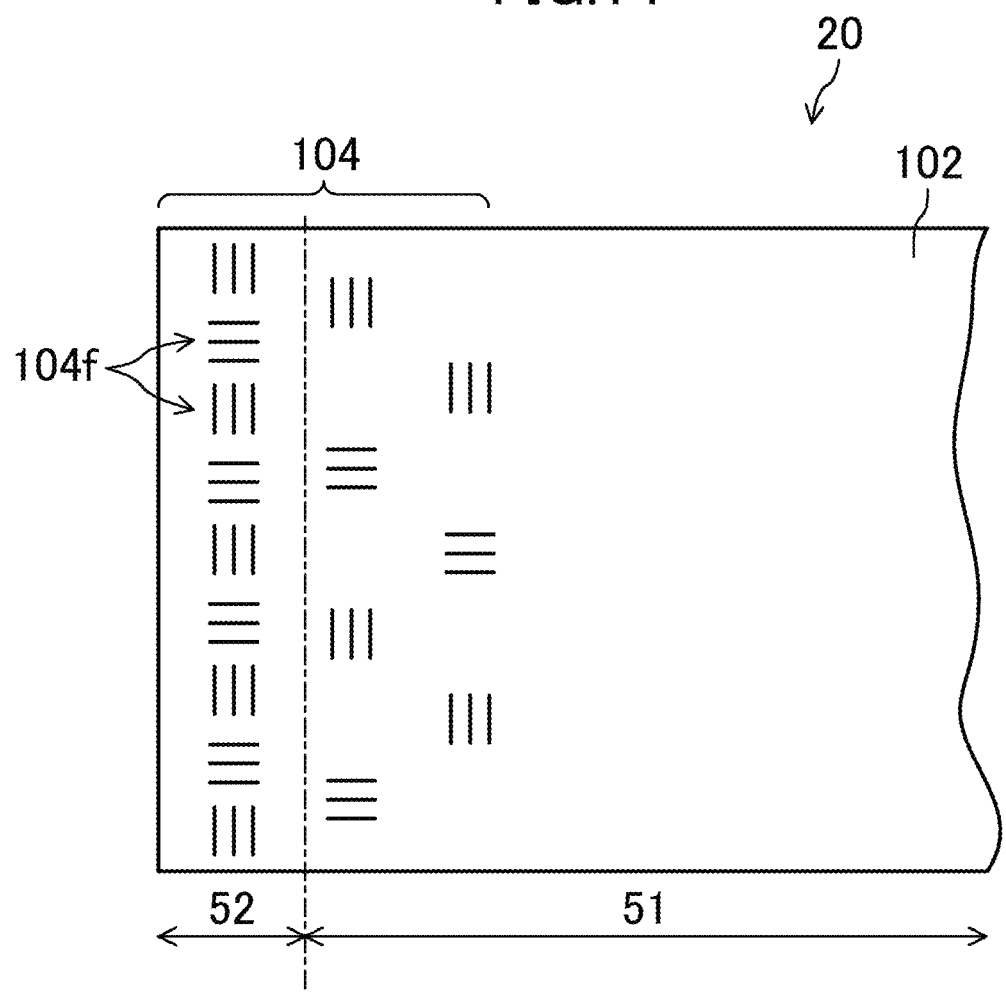
FIG. 14 is a plan view of an optical sheet according to a further variation.

4. <Configuration, Such as the Configurations Shown in FIGS. 13 and 14, Different from the Configurations 1 to 3 Described Above>

In the configuration shown in FIG. 13, a luminance equalization region 104 includes dots 111B having a relatively large size, and dots 111C disposed around each of the dots 111B and having a relatively small size. The density of the dots 111B and 111C arranged decreases with an increasing distance from the end region 52. The dots 111B and 111C may be made of different materials, and may be printed separately.

In the configuration shown in FIG. 14, a luminance equalization region 104 includes a plurality of strip-like small regions 104*f*. The density of the strip-like small regions 104*f* arranged decreases with an increasing distance from the end region 52. Two adjacent ones of the strip-like small regions 104*f* may have different strip orientations.

In addition to the luminance equalization regions 104 shown in FIGS. 13 and 14, for example, a luminance equalization region 104 printed in a radial pattern or in a zigzag pattern, and other similar regions may also be used although not shown.

Regardless of the configurations of the various luminance equalization regions 104 described above, the largest dimension of a portion of the luminance equalization region 104 in the visible region 51 may be set to be 60 μm or less, preferably 50 μm or less, and more preferably 40 μm or less. This configuration makes it less likely that the colored portion 109 having a smaller dimension than the luminance equalization region 104, i.e., the light-transmitting portion 110, is visually recognized.

In addition, if the portion of the luminance equalization region 104 in the visible region 51 includes a plurality of colored portions 109 separated from each other, the distance between the colored portions 109 may be greater than the dimension or width of each of the colored portions 109 (the dimension of the smallest one of the colored portions 109 if the colored portions have different dimensions). In this configuration, even if the luminance equalization region 104 has a complicated shape, the colored portions 109 are not close to one another, which makes it possible to prevent the colored portions 109 from being visually recognized.

If each colored portion 109 described herein includes a plurality of colored particles 112 just like the dot 111 shown in FIG. 6, the colored portion 109 is a region in the light-transmitting portion 110 (the transparent ink 113 of the dot 111 shown in FIG. 6) where the colored particles 112 are distributed. The width of the colored portion 109 means the greatest one of the distances between the colored particles 112 distributed in the light-transmitting portion 110 when the surface of the optical sheet (the diffusion sheet 20 in this embodiment) including the luminance equalization region 104 is observed from above (hereinafter referred to as "when observed from the front"). The area of the colored portion 109 (the area of the circle surrounding the colored particles 112 in FIG. 6) means the total area of the colored particles 112 present in the light-transmitting portion 110 (when observed from the front).

Figure 15:
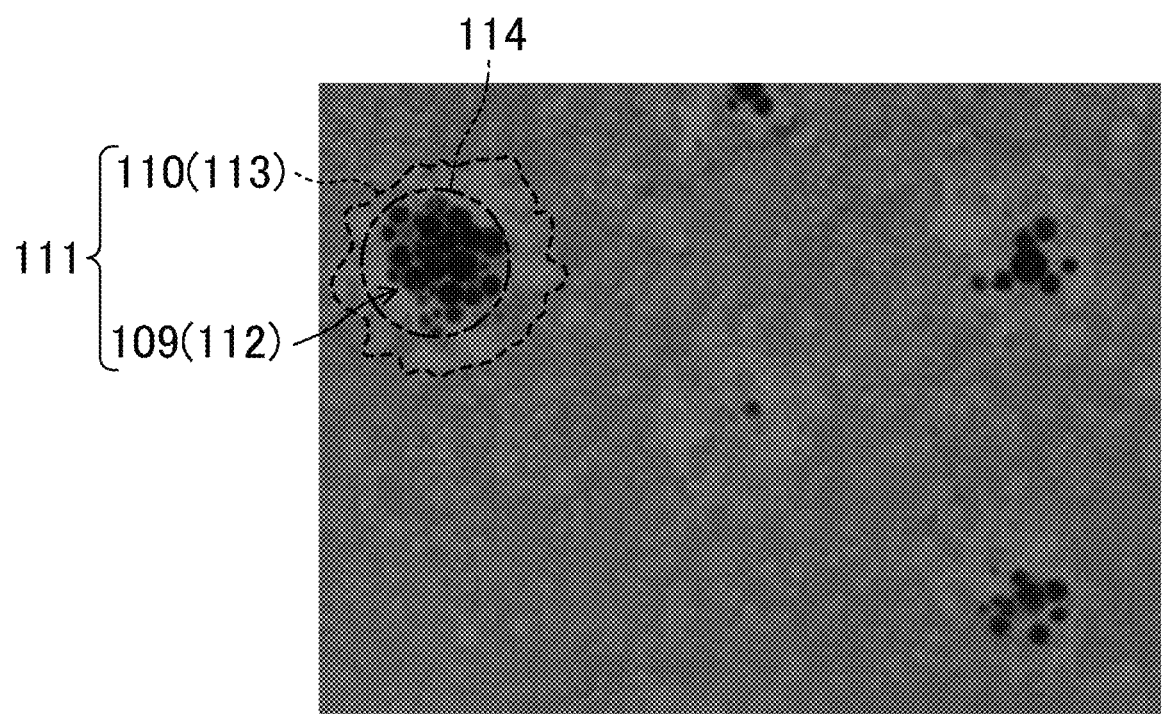
FIG. 15 shows a method for measuring a dimension of a colored portion of a dot forming part of a luminance equalization region of an optical sheet according to an embodiment.

FIG. 15 is an image obtained when a dot 111 is observed from the front using an optical microscope. The dot 111 has a colored portion 109 including a plurality of colored particles 112, and a light-transmitting portion 110 that surrounds the colored portion 109 and made of a transparent ink 113. The image shown in FIG. 15 was obtained by performing a transmission measurement using a digital microscope manufactured by Keyence Corporation (VHX-6000 (a controller), VHX-6100/6020 (a camera unit), VHX-ZST (a high-resolution zoom lens) with a 2000-fold magnification and a capture resolution of 1600×1200 pixels.

The diameter of the virtual circle (surrounding circle) 114 shown in FIG. 15 corresponds to the width of the colored portion 109 (the greatest one of the distances between the colored particles 112). The greatest one of the distances between the colored particles 112 may be determined through a visual check of the image shown in FIG. 15, for example. The image shown in FIG. 15 is used to separate the colored portion 109 and the light-transmitting portion 110 from each other based on the difference between the luminance of the colored portion 109 and the luminance of the light-transmitting portion 110 around the colored portion 109, thereby making it possible to measure the area of the colored portion 109. Likewise, the image shown in FIG. 15 is used to separate the colored particles 112 and the light-transmitting portion 110 from each other based on the difference between the luminance of the colored particles 112 and the luminance of the light-transmitting portion 110 around the colored particles 112, thereby making it possible to measure the sizes of the individual colored particles 112 (the diameters of the individual colored particles 112 if these particles are substantially spherical).

Under the definitions and the measurement method described above, the width of the colored portion 109 is usually 3 μm or more, preferably 5 μm or more, and more preferably 10 μm or more, and is usually 100 μm or less, preferably 80 μm or less, more preferably 50 μm or less, and still more preferably 40 μm or less. This configuration can reduce the influence of light leakage and hot spots, and substantially prevent the colored portion 109 from being visually recognized.

The area of the colored portion 109 is usually 5 $\mu m^2$ or more, preferably 10 $\mu m^2$ or more, more preferably 20 $\mu m^2$ or more, still more preferably 30 $\mu m^2$ or more, further preferably 40 $\mu m^2$ or more, and most preferably 50 $\mu m^2$ or more, and is usually 2000 $\mu m^2$ or less, preferably 1500 $\mu m^2$ or less, and more preferably 1300 $\mu m^2$ or less. This configuration can reduce the influence of light leakage and hot spots, and substantially prevent the colored portion 109 from being visually recognized.

The (average) size of the colored particles 112 is a mean value of the sizes of widest portions of ten colored particles 112 selected. This size is usually 0.5 μm or more, preferably 1 μm or more, and more preferably 3 μm or more, and is usually 10 μm or less, and preferably 8 μm or less. If the sizes of the individual colored particles 112 are smaller than the range described above, the colored particles 112 are inevitably dispersed in the light-transmitting portion 110 (the transparent ink 113), and the width of the colored portion 109 is thus increased. As a result, the colored portion 109 is visually recognized easily. In contrast, if the sizes of the individual colored particles 112 are larger than the range described above, uneven printing easily occurs.

As described above, the light-transmitting portion 110 is a region of the optical sheet on which a light-transmitting layer is formed. This region includes the colored portion 109. Here, if the luminance equalization region 104 includes a plurality of dots 111, the area of the light-transmitting portion 110 (the dot 111) (which area includes the area of the colored portion 109 where the colored particles 112 are distributed) is the area calculated in the following manner. Specifically, the boundary between the light-transmitting portion 110 (the dot 111) and the surface of the optical sheet on which the light-transmitting portion 110 (the dot 111) is formed is visually recognized on the image obtained by the observation from the front using an optical microscope. If the light-transmitting portion 110 (the dot 111) is generally circular, a surrounding circle (virtual circle) having a center and a diameter obtained through specification of three optional points on the circumference of the circle is used. Alternatively, if the light-transmitting portion 110 (the dot 111) is polygonal, or has an indefinite shape, just like the dot 111A (see FIG. 10), the area of the light-transmitting portion 110 is the area calculated through approximation of the outline of the light-transmitting portion 110 (the dot 111) to a polygonal shape.

Figure 16:
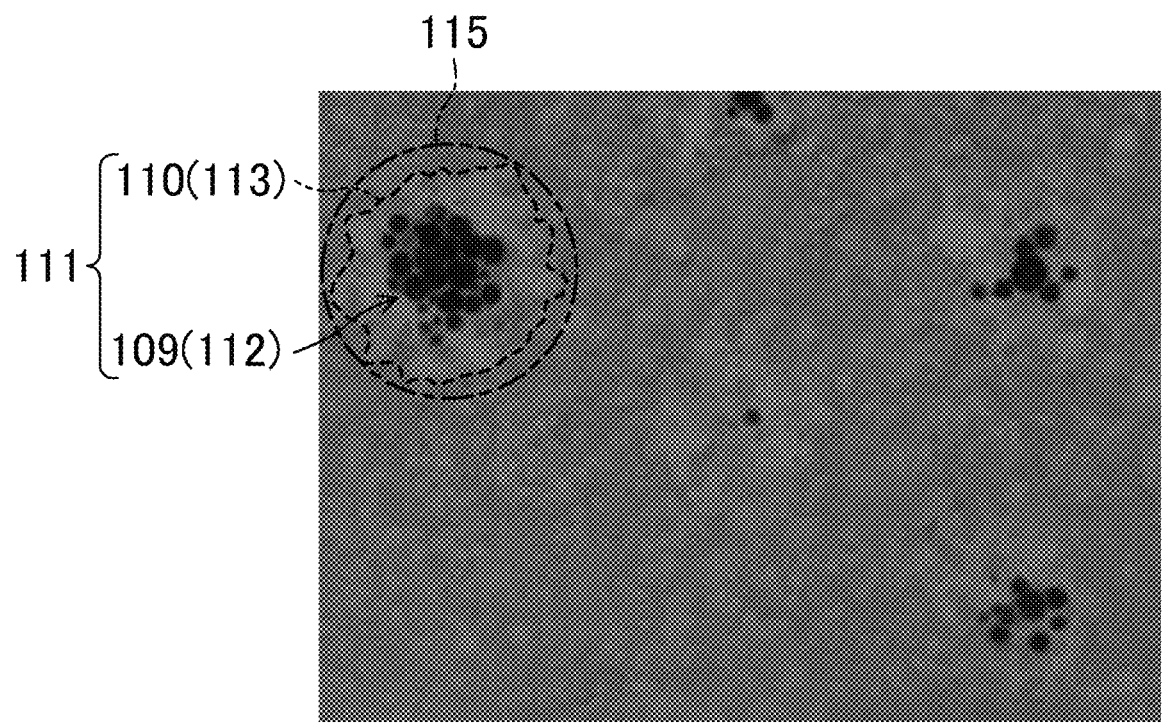
FIG. 16 shows a method for measuring a dimension of a dot (a light-transmitting portion) forming part of a luminance equalization region of an optical sheet according to an embodiment.

FIG. 16 shows a light-transmitting portion 110 (a dot 111) on the image shown in FIG. 15 using a virtual circle (surrounding circle) 115. It is possible to determine the area of the light-transmitting portion 110 (the dot 111) shown in FIG. 15 (including the area of the colored portion 109) by calculating the area of the virtual circle (surrounding circle) 115. The diameter of the virtual circle (surrounding circle) 115 may be the dimension of the light-transmitting portion 110, i.e., the dimension of the dot 111.

In this embodiment, if the light-transmitting portion 110 is made of the transparent ink 113, and the colored portion 109 includes a plurality of colored particles 112, the content of the colored particles 112 in the transparent ink 113 may be set to be usually 30% by mass or less, preferably 20% by mass or less, and more preferably 10% by mass or less. These ranges of the content make it easier to achieve the structure in which the colored portion 109 including the colored particles 112 is surrounded by the light-transmitting portion 110 made of the transparent ink 113.

In this embodiment, if the luminance equalization region 104 has a region comprised of the dots 111, it is recommended that each of the dots 111 have the colored portion 109 and the light-transmitting portion 110 both described above. This means that the outline (outer shape) of the dot 111 is defined by the light-transmitting portion 110, but that the light-transmitting portion 110 itself is difficult to visually recognize. Besides, since the colored portion 109 is surrounded by the light-transmitting portion 110, the dimension of the colored portion 109 is smaller than the outer dimension of the dot 111. Thus, sufficiently reducing the outer dimension of the dot 111 allows the colored portion 109 to have a dimension that makes it difficult to visually recognize the colored portion 109. Accordingly, each dot 111 having the light-transmitting portion 110 and the colored portion 109 is difficult to visually recognize. This makes it also difficult to visually recognize the luminance equalization region 104 as a whole which includes the dots 111. A reduction in visibility of the liquid crystal display device can thus be prevented.

The "colored portion 109" in this example may also be colored entirely. However, it is recommended that the colored portion 109 be formed as an aggregate of the colored particles 112 as described above. If the "colored portion 109" includes a plurality of colored particles 112, it is recommended that the colored particles 112 be aggregated. Specifically, forming the dot 111, when observed from the display surface 50a, such that the doughnut-shaped light-transmitting portion 110 surrounds the colored portion 109 (an aggregate of the colored particles 112), as shown, for example, in FIG. 6, can improve the absorbency of light with an extremely high intensity caused by the light leaking from the light sources 26 and hot spots, and can also keep it less likely that the dot 111 is visually recognized.

In this embodiment, if the luminance equalization region 104 has a region comprised of the dots 111, it is recommended that the ratio of the area of the colored portion 109 of each dot 111 to the total area of the dot 111 (including the area of the light-transmitting portion 110 forming part of the dot 111) may be preferably 50% or less, more preferably 40% or less, still more preferably 30% or less, yet more preferably 25% or less, and most preferably 20% or less. That is to say, if the shape of the dot 111 (the shape of the light-transmitting portion 110) and the shape of the colored portion 109 are both substantially circular (when observed from the front), the ratio of the diameter of the colored portion 109 to the diameter of the dot 111 (the diameter of the light-transmitting portion 110) may be preferably 70% or less, more preferably 63% or less, still more preferably 55% or less, yet more preferably 50% or less, and most preferably 45% or less. In this case, since each dot 111 has a sufficiently small colored portion 109, it is less likely that the colored portion 109 of the dot 111 is visually recognized. Thus, even if a portion of the luminance equalization region 104 is present in the visible region 51, the luminance equalization region 104 is difficult to visually recognize.

Examples

Figure 17:
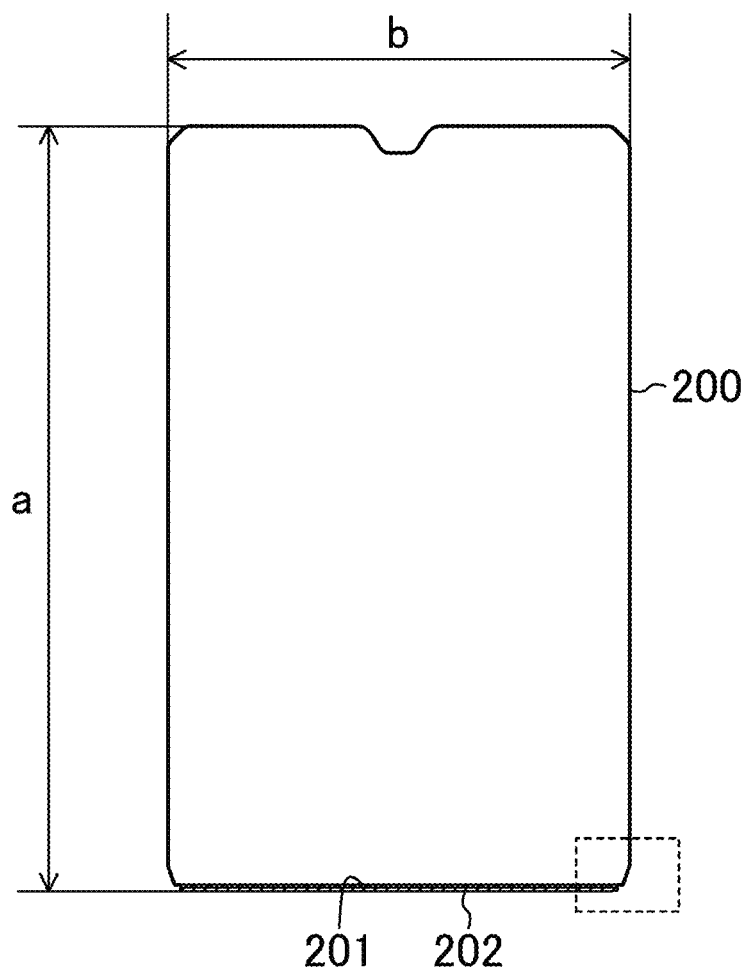
FIG. 17 is a plan view of a diffusion sheet according to a first example.
Figure 18:
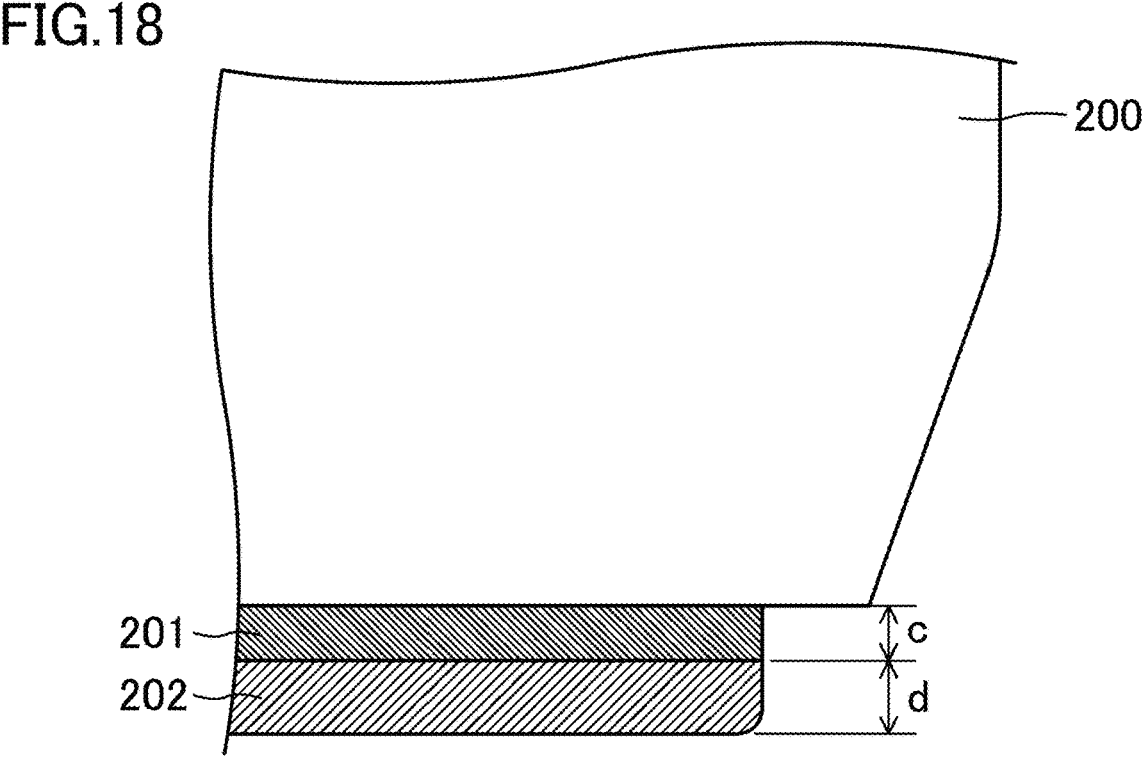
FIG. 18 is an enlarged plan view of a portion of the diffusion sheet according to the first example.
Figure 19:
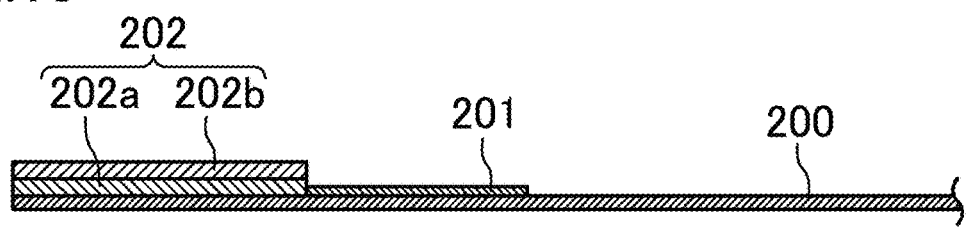
FIG. 19 is a cross-sectional view of the diffusion sheet according to the first example.
Figure 20:
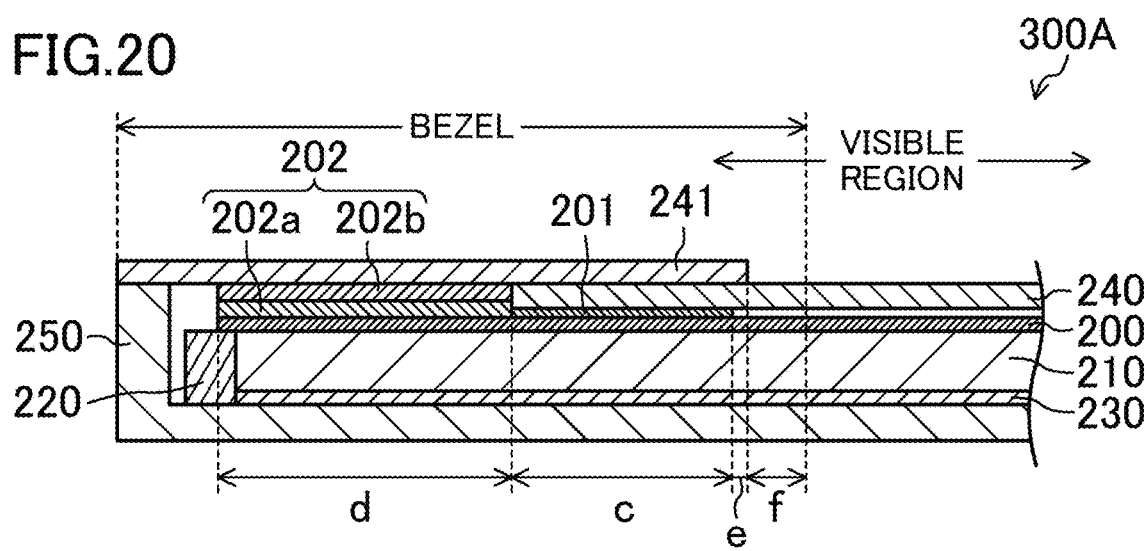
FIG. 20 is a cross-sectional view of a backlight unit according to the first example.
Figure 21:
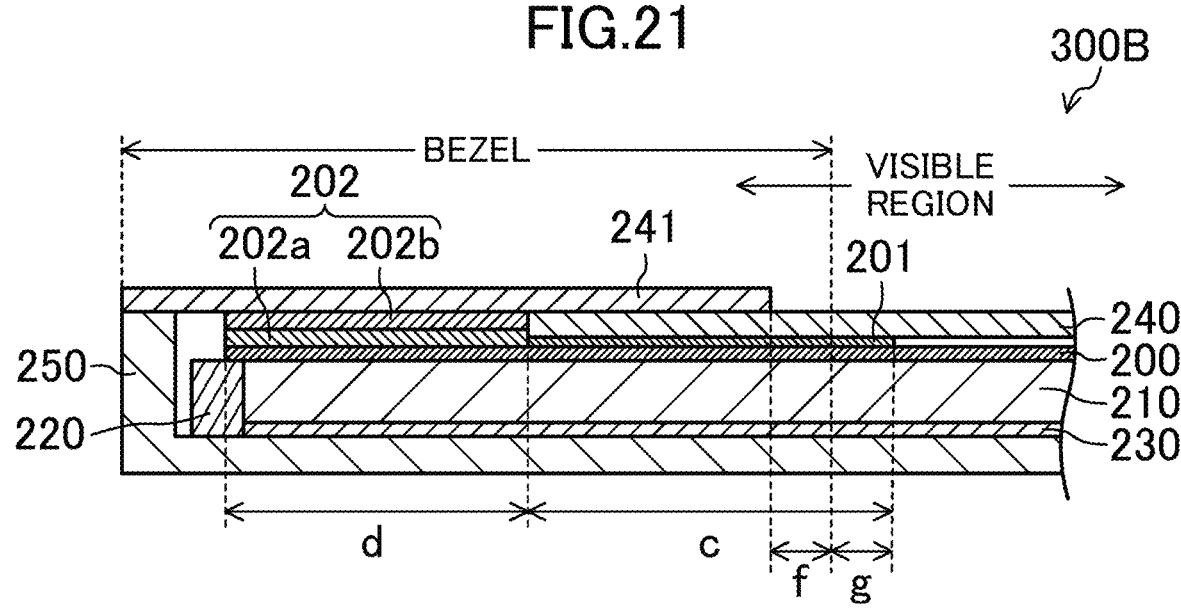
FIG. 21 is a cross-sectional view of a backlight unit according to a second example.

A diffusion sheet and a backlight unit according to an example will now be described with reference to the drawings. FIG. 17 is a plan view of a diffusion sheet according to a first example. FIG. 18 is an enlarged plan view of a region of the diffusion sheet indicated by the broken line in FIG. 17. FIG. 19 is a cross-sectional view of the diffusion sheet according to the first example. FIGS. 20 and 21 are cross-sectional views of backlight units according to the first example and a second example, respectively.

As shown in FIGS. 17 to 19, a printed portion 201 toward the center of the sheet and a tape portion 202 toward the periphery of the sheet are formed on a surface, of the diffusion sheet 200 according to the first example, close to one side near light sources. Here, the dimension (a) of each of the long sides of the diffusion sheet 200 is, for example, 150 mm, and the dimension (b) of each of the short sides of the diffusion sheet 200 is, for example, 70 mm Light sources 220 (see FIG. 20) are provided near one of the short sides. The printed portion 201 is the luminance equalization region of the present disclosure described above. The tape portion 202 has a laminated structure including a lower white tape portion 202a and an upper black tape portion 202b, and is thicker than the printed portion 201. The width (c) of the printed portion 201 is, for example, 0.6 mm. The width (d) of the tape portion 202 is, for example, 0.8 mm.

The shape, size, and other features of the diffusion sheet 200, the presence or absence, printed surface, printed region, printing pattern, print span, and other features of the printed portion 201, and the presence or absence, specifications, width, and other features of the tape portion 202 differ among models of a liquid crystal display device including the diffusion sheet 200.

As shown in FIG. 20, a backlight unit 300A according to the first example includes the diffusion sheet 200 (including the printed portion 201 and the tape portion 202) described above, a light guide film 210 provided under the back surface of the diffusion sheet 200, the light sources 220, such as LEDs, provided on one side surface of the light guide film 210, a reflection sheet 230 provided under the back surface of the light guide film 210, and a prism sheet 240 provided above a surface of a portion of the diffusion sheet 200 except the tape portion 202, and a frame 250 on which the above-described components are placed. A black tape portion 241 is provided on a surface of a portion of the prism sheet 240 close to one side of the prism sheet 240 toward the light sources 220 and on a surface of the tape portion 202. The black tape portion 241 extends beyond the printed portion 201 toward the center of the diffusion sheet 200 by a distance (e) (for example, 0.05 mm).

In addition, the bezel of the liquid crystal display device (see FIGS. 1 and 2) including the backlight unit 300A shown in FIG. 20 extends beyond the black tape portion 241 toward the center of the diffusion sheet 200 by a distance (f) (for example, 0.5 mm). On the other hand, when viewed obliquely, the visible region of the liquid crystal display device overlaps with an end portion of the printed portion 201 toward the center of the diffusion sheet 200. In other words, when viewed obliquely, a portion of the printed portion 201 (functioning as the luminance equalization region) is present in a region (visible region) that can be visually recognized by the user.

The backlight unit 300B according to the second example shown in FIG. 21 differs from the backlight unit 300A described above in that the printed portion 201 shown in FIGS. 17 to 19 has a width (c) as great as, for example, 1.75 mm, and extends beyond the bezel toward the center of the diffusion sheet 200 by a distance (g) (for example, 0.6 mm).

A luminance measurement using the backlight units 300A and 300B (hereinafter collectively referred to as the backlight unit 300) shown in FIGS. 20 and 21, respectively, will now be described with reference to FIG. 22.

Figure 22:
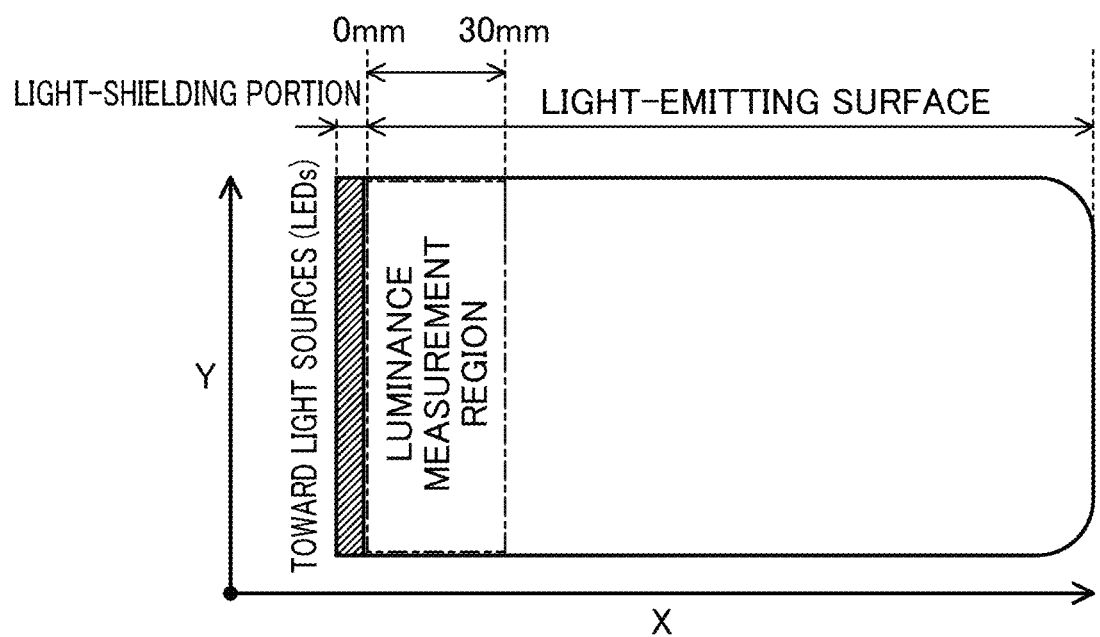
FIG. 22 shows a method for measuring luminance using the backlight unit according to the first or second example.

As shown in FIG. 22, a region, of the surface of the backlight unit 300 (the prism sheet 240) as a measurement target, covered with the black tape portion 241 is defined as a light-shielding portion, and the other region is defined as a light-emitting surface. An X-axis is determined to extend from the light sources 220 along the long sides of the backlight unit 300, and a Y-axis is determined to extend in the direction perpendicular to the X-axis, i.e., along the short sides of the backlight unit 300. Then, the boundary between the light-shielding portion and the light-emitting surface, i.e., an end of the light-emitting surface (the end of the light-emitting surface even in a case in which the light-shielding portion is not provided, or in a case in which the light-shielding portion and the light-emitting surface are not adjacent to each other) is determined to be the 0-mm point of the X-axis (the so-called origin point), and a region of the backlight unit 300 from the 0-mm point to the 30-mm point of the X-axis (in a direction remote from the light sources 220) is determined to be a luminance measurement region. The 30-mm point of the X-axis is where there is no influence of the hot spots. The size of the luminance measurement region determined in this way is 30 mm (in the X-direction)× 72.368 mm (in the Y-direction) (=2171.04 mm²). The luminance measurement for one section of the luminance measurement region is directed to a single-point luminance region having a size of 0.29 mm (in the X-direction)×0.29 mm (in the Y-direction) (=about 0.0841 mm²).

In this luminance measurement, in order to eliminate the influence of a measurement error, all the luminance values measured are corrected by using a correction ratio obtained when the luminance at a point closest to the frame 250 of the backlight unit 300 (a position that is less likely to be affected by the measurement error) is corrected to be 7100 candela (cd) at the 30-mm point of the X-axis (a position where there is no influence of the hot spots). In addition, three successive luminance measurement lines are determined in the luminance measurement region described above to successively measure the luminance values of a region extending from the 0-mm point to 30-mm point of the X-axis. Each of the successive luminance measurement lines includes single-point luminance regions (about 0.0841 mm²) of the region from 0-mm to 30-mm point, i.e., about 103 single-point luminance regions (=30 mm/0.29 mm). Since the intensity and range of hot spots may differ between the backlight units 300, the three successive luminance measurement lines are independently determined for each of the backlight units 300, i.e., measurement targets. Among the luminance values measured with respect to the three successive luminance measurement lines, the average of three values at the same point on the X-axis is taken. The luminance at the 30-mm point of the X-axis is defined as a stable luminance A maximum luminance difference between a maximum or minimum luminance of the measured luminance values (average values) and the stable luminance is calculated as the ratio with respect to the stable luminance. If the luminance difference is within ±10%, a determination is made that the hot spots have been successfully hidden. The positions of the three successive luminance measurement lines are determined as follows, for example. Specifically, a total of three single-point luminance values are selected from single-point luminance values measured at positions within 0.3 to 0.6 mm from the origin point of the X-axis. These three single-point luminance values include two maximum luminance values in the Y-direction and one average luminance value of all of the luminance values in the Y-direction, and the successive luminance measurement lines are set at the three positions where these three values are measured. In other words, successive luminance values in the X-direction are measured along the three successive luminance measurement lines including the positions where the three values are measured.

In this luminance measurement, a two-dimensional CCD color luminance meter (RISA-COLOR/ONE) manufactured by HI-LAND is used as a measuring instrument, and a direct-current stabilized power supply (TEXIO PAR-A series, 36V/3A model) manufactured by TEXIO TECHNOLOGY CORPORATION is used as a power supply. Settings of the measuring instrument for a CCD camera are, for example, a brightness of 4, a zoom of 20, a focus of 1, and a height (a distance from the CCD camera to a target object) of 1 m. Settings of the measuring instrument for software are, for example, a brightness of $\frac{1}{10000}$. In addition, the power supply is set to deliver a voltage of 14.30 V and a current of 0.040 A.

Figure 24:
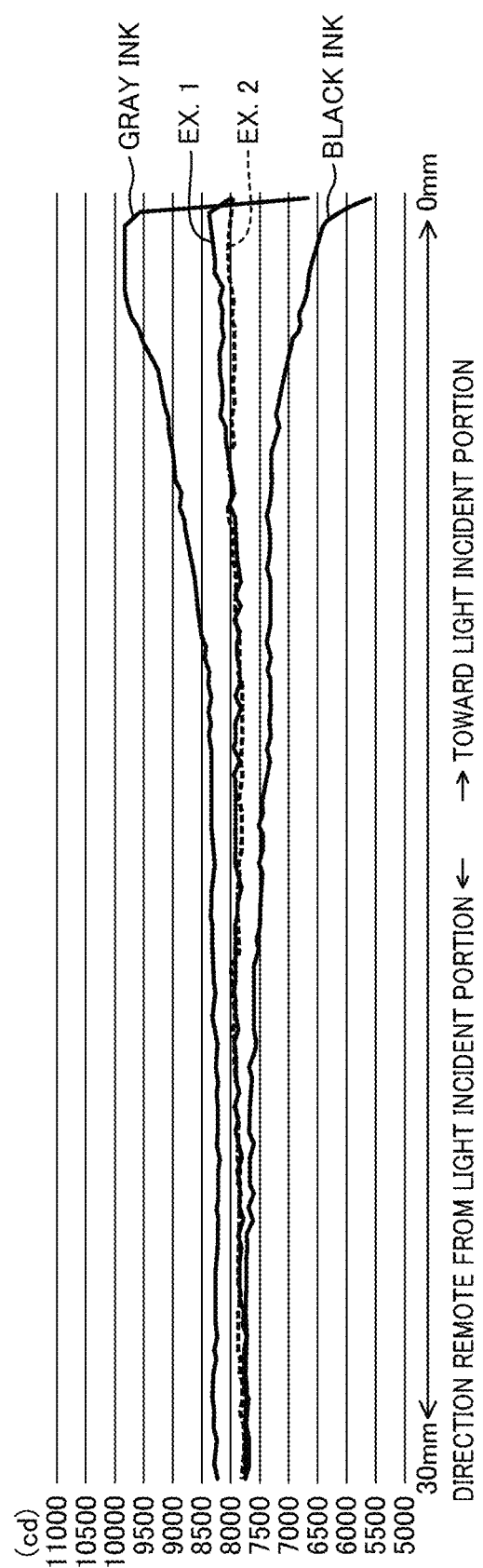
FIG. 24 is a graph showing the hot spot hiding effects provided by the first and second examples.
Figure 25:
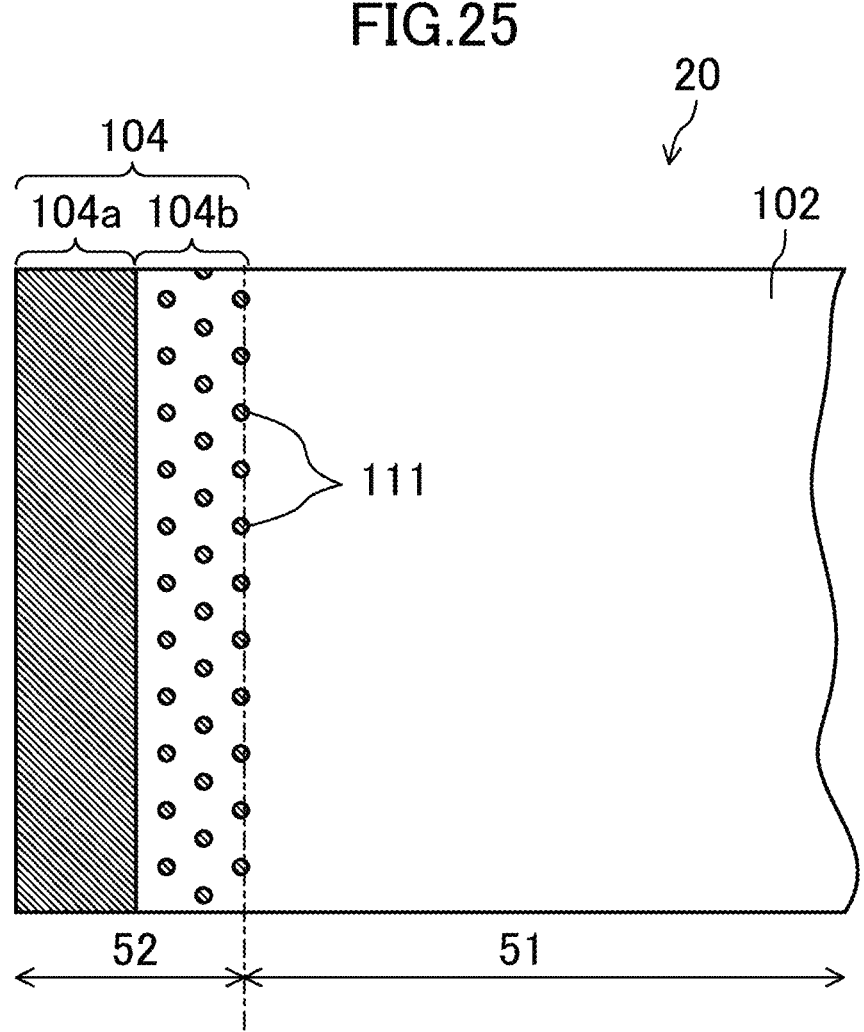
FIG. 25 is a plan view showing a luminance equalization region according to the first example.
Figure 26:
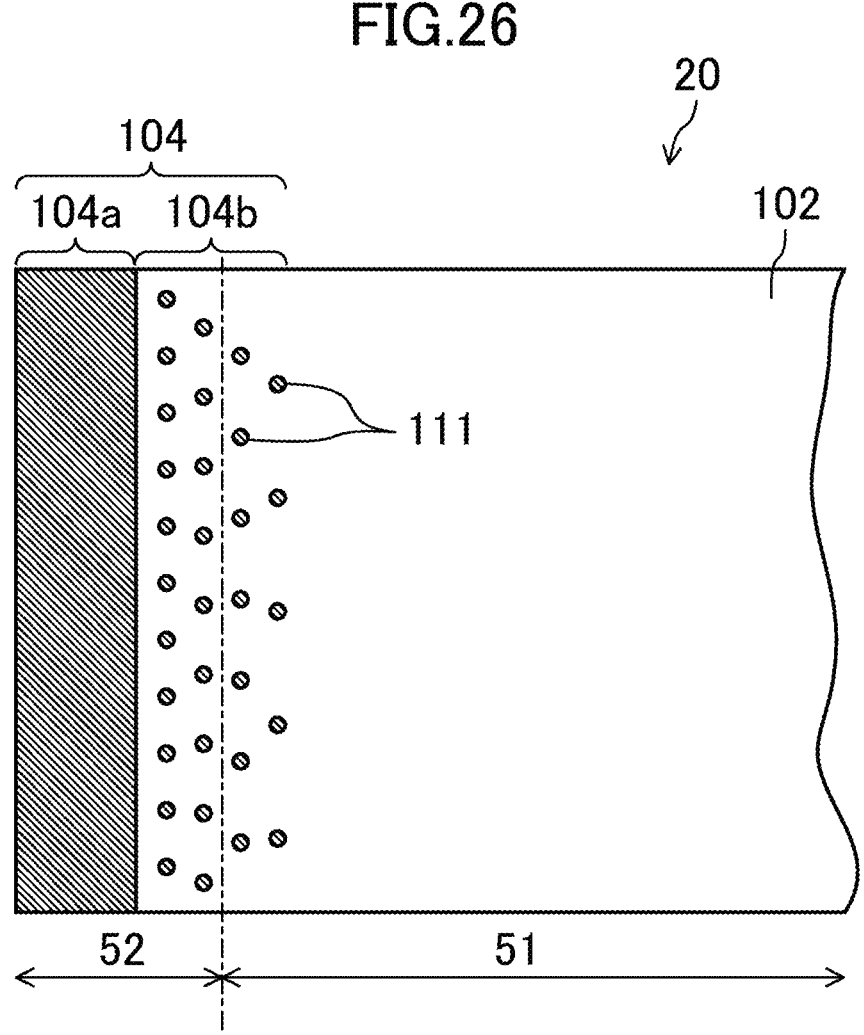
FIG. 26 is a plan view showing a luminance equalization region according to the second example.

FIGS. 23 and 24 show a hot spot hiding effect obtained when a luminance equalization region 104 (which includes a band-like first luminance equalization region 104a (a narrow solid region) and a second luminance equalization region 104b including a plurality of dots 111 (high-definition dots)) as shown in FIGS. 25 and 26 was provided as the printed portion 201 of each of the first and second examples. In FIGS. 25 and 26, all of the dots 111 have substantially an equal size. However, the second luminance equalization region 104b shown in FIG. 25 includes the dots 111 arranged at substantially a uniform density, whereas the second luminance equalization region 104b shown in FIG. 26 includes the dots 111 arranged at a density that decreases in a direction away from the first luminance equalization region 104a. The dots 111 include black beads serving as the colored particles 112, and the transparent ink 113 serving as the light-transmitting portion 110. In addition, the size of the dots 111 was set to be about 40 μm, the particle size (average) of the colored particles 112 (black beads) was set to be about 7 μm, and the content of the colored particles 112 (black beads) in the transparent ink 113 was set to be about 10% by mass with respect to 100% by mass of the transparent ink 113. For comparison, results obtained when the configuration shown in FIG. 25 (the narrow solid region+ high-definition dots) was printed using black ink (a first comparative example) and gray ink (a second comparative example) as a material for a printed portion 201 (having the same size as the printed portion of the first example) are also shown in FIGS. 23 and 24. The printed portion 201 was printed by a cylinder screen printing machine.

As shown in FIG. 23, the luminance difference of the first example (the backlight unit 300A shown in FIG. 20) is 8%, which shows that a good hot spot hiding effect is obtained. The luminance difference of the second example (the backlight unit 300B shown in FIG. 21) is 4%, which shows that a better hot spot hiding effect is obtained. However, the luminance differences of the first and second comparative examples are as large as −28% and 17%, respectively, and a hot spot hiding effect is not sufficient. Further, as shown in FIG. 24, in both of the first and second examples, substantially a uniform luminance is stably obtained across the entire luminance measurement region, whereas in the first comparative example, the luminance near the light sources 220 is lower than the stable luminance, and in the second comparative example, the luminance near the light sources 220 is higher than the stable luminance. In both of the comparative examples, the luminance is non-uniform and unstable.

FIG. 23 further shows the visibility of the printed portion 201 (print visibility) when the printed portion 201 is viewed from the front surface of the backlight unit 300 (the front surface of the prism sheet 240). In this table, "x" indicates that a viewer visually recognized the printed portion 201, and "o" indicates that the viewer did not visually recognize the printed portion 201. The visibility was checked with the backlight unit 300 on. As shown in FIG. 23, the print visibility was evaluated as "o" in both of the first and second examples, whereas the print visibility was evaluated as "x" in both of the first and second comparative examples.

FIG. 27 shows results of evaluating the visibility, while changing the ratio of the area of the colored portion 109 to the entire area of each dot 111, in a case in which the above-described luminance equalization region 104 shown in FIG. 25 was provided as the printed portion 201 of the first example. In FIG. 27, "x" indicates that a viewer visually recognized the printed portion 201, and "o" indicates that the viewer did not visually recognize the printed portion 201. The visibility was checked with the backlight unit 300 on.

Specifically, first, a plurality of printing materials were prepared. The printing materials respectively contain about 5% by mass, about 8% by mass, about 10% by mass, about 17% by mass, about 32% by mass, about 45% by mass, and about 50% by mass of the colored particles 112 (black beads) with respect to 100% by mass of the transparent ink 113. Next, the printing materials were each printed by a cylinder screen printing machine so that the density of the dots (the areal percentage of the dots 111 in a region of the printed portion 201 where the high-definition dots (the second luminance equalization region 104b) were arranged) was 5%, 10%, 20%, 30%, or 35%, thus forming the printed portion 201. Here, the diameter of each dot 111 was set to be about 40 μm.

Twenty of the dots 111 in the printed portion 201 made of each of the printing materials were optionally selected to calculate the ratio of the area of the colored portion 109 to the entire area of each of these twenty dots 111. The calculated ratios were averaged. As a result, the areal percentage of the colored portion 109 was about 5% in a case in which the content of the colored particles 112 was about 5% by mass; the areal percentage of the colored portion 109 was about 10% in a case in which the content of the colored particles 112 was about 8% by mass; the areal percentage of the colored portion 109 was about 20% in a case in which the content of the colored particles 112 was about 10% by mass; the areal percentage of the colored portion 109 was about 30% in a case in which the content of the colored particles 112 was about 17% by mass; the areal percentage of the colored portion 109 was about 40% in a case in which the content of the colored particles 112 was about 32% by mass; and the areal percentage of the colored portion 109 was about 50% in a case in which the content of the colored particles 112 was about 45% by mass. The printing material containing about 50% by mass of the colored particles 112 had excessively high viscosity, which made it impossible to form the dots 111.

As shown in FIG. 27, in the case in which the areal percentage of the colored portion 109 was about 5% and about 10%, the visibility of the printed portion 201 (print visibility) when the printed portion 201 is viewed from the front surface of the backlight unit 300 (the front surface of the prism sheet 240) was evaluated as "o" in all of the cases in which the density of the dots was 5% to 35%. In the case in which the areal percentage of the colored portion 109 was about 20% and about 30%, the visibility was evaluated as "o" in a case in which the density of the dots was 5% and 10%, but the visibility was evaluated as "x" in a case in which the density of the dots was 20% or more. In addition, in the case in which the areal percentage of the colored portion 109 was about 40% and about 50%, the visibility was evaluated as "o" in a case in which the density of the dots was 5%, but the visibility was evaluated as "x" in a case in which the density of the dots was 10% or more.

Note that the present disclosure is not limited to the embodiments described above, and various changes and modifications may be made without departing from the scope of the present disclosure. That is to say, the foregoing description of the embodiment is merely an example in nature, and is not intended to limit the scope, application, or uses of the present disclosure.

For example, this embodiment (including the examples, the same hereinafter) is directed to an edge-lit backlight unit, but may be alternatively directed to a direct-lit backlight unit. In the direct-lit backlight unit, a luminance equalization region may be provided so as to be positioned above a linear light source.

This embodiment is directed to an edge-lit backlight unit, and a luminance equalization region is arranged in the vicinity of one side of a diffusion sheet toward the light sources. However, alternatively, luminance equalization regions may be arranged in the vicinity of the four sides of the diffusion sheet.

In this embodiment, the luminance equalization region is provided on the front surface of the diffusion sheet. However, alternatively, the luminance equalization region may be provided on the back surface of the diffusion sheet. Alternatively, a luminance equalization region may be provided on the back surface of an optical sheet, such as a prism sheet, other than the diffusion sheet.

In addition, in this embodiment, the plurality of dots forming part of the luminance equalization region are formed by gradation printing, while changing the dot size or the density of the dots arranged. However, alternatively, the compositions or the content of at least one of a colored portion (colored particles) and a light-transmitting portion (transparent ink) that form a dot may be changed.

What is claimed is:

1. An optical sheet incorporated into a liquid crystal display device having a display surface, a distance from an end of the display surface to an end of a visible region of the display surface being 10 mm or less, wherein
the optical sheet includes a luminance equalization region formed on one surface of the optical sheet to equalize luminance of the visible region,
the luminance equalization region in its entirety or part is in at least the visible region in a state in which the optical sheet is incorporated into the liquid crystal display device,
the luminance equalization region in the visible region has a colored portion and a light-transmitting portion that surrounds the colored portion, and
the colored portion comprises a light absorbing agent.

2. The optical sheet of claim 1, wherein the colored portion includes a plurality of colored particles.

3. The optical sheet of claim 2, wherein the light-transmitting portion is a transparent ink.

4. The optical sheet of claim 1, wherein the luminance equalization region in the visible region includes a plurality of dots, and each of the dots has the colored portion and the light-transmitting portion.

5. The optical sheet of claim 4, wherein a ratio of an area of the colored portion to an entire area of each dot is 50% or less.

6. The optical sheet of claim 5, wherein the ratio is 30% or less, and an areal percentage of the dots is 10% or less.

7. The optical sheet of claim 4, wherein the dots are arranged by gradation near the end of the visible region.

8. The optical sheet of claim 1, wherein the colored portion has a width from 10 μm to 40 μm.

9. The optical sheet of claim 1, wherein the colored portion has an area from 50 $μm^2$ to 1300 $μm^2$.

10. The optical sheet of claim 1, wherein the luminance equalization region present in the visible region includes the colored portion Which is comprised of a plurality of colored portions, and
a distance between the colored portions is greater than a width of each of the colored portions.

11. A backlight unit incorporated into a liquid crystal display device having a display surface, the backlight unit being configured to guide light emitted from a light source to the display surface, the backlight unit comprising:
the optical sheet of claim 1.

12. A liquid crystal display device comprising:
the backlight unit of claim 11; and
a liquid crystal display panel.

13. Information equipment comprising:
the liquid crystal display device of claim 12.

14. The optical sheet of claim 1, wherein the light absorbing agent is a black material.

* * * * *